United States Patent [19]
Tsuzuki et al.

[11] Patent Number: 5,801,499
[45] Date of Patent: Sep. 1, 1998

[54] CONTROL SYSTEM FOR A VEHICULAR DRIVE UNIT

[75] Inventors: Shigeo Tsuzuki, Takahama; Takeshi Hara, Chiryu; Manabu Watanabe, Toyota; Kenji Omote; Satoru Tanaka, both of Nishio, all of Japan

[73] Assignee: Aisin AW Co., Ltd., Anjo, Japan

[21] Appl. No.: 676,807

[22] Filed: Jul. 8, 1996

[30] Foreign Application Priority Data

Jul. 11, 1995 [JP] Japan ................................. 7-197142
Aug. 3, 1995 [JP] Japan ................................. 7-198778

[51] Int. Cl.$^6$ ................................................. H02P 5/20
[52] U.S. Cl. .................... 318/141; 318/146; 180/65.2; 180/65.6; 290/34
[58] Field of Search ........................... 180/65.1, 65.2, 180/65.3, 65.4, 65.6; 290/50, 45, 34; 318/140, 141, 142, 145, 146, 150, 153, 156

[56] References Cited

U.S. PATENT DOCUMENTS

| | | | |
|---|---|---|---|
| 4,533,011 | 8/1985 | Heidemayer et al. | |
| 5,081,365 | 1/1992 | Field et al. | 290/45 |
| 5,258,651 | 11/1993 | Sherman | |
| 5,285,111 | 2/1994 | Sherman | |
| 5,433,282 | 7/1995 | Morotor et al. | 180/65.2 |
| 5,468,816 | 11/1995 | Murakawa et al. | 290/50 |
| 5,632,238 | 5/1997 | Furukawa et al. | 123/179.3 |

*Primary Examiner*—John W. Cabeca
*Attorney, Agent, or Firm*—Oliff & Berridge, PLC

[57] ABSTRACT

A control system for a vehicular drive unit that includes an engine, a motor-generator connected to the output shaft of the engine and which acts as both a motor and a generator, a battery for storing the energy recovered by the motor-generator as electric power and for feeding electric power to drive the motor-generator, a first clutch for connecting the motor-generator and the wheels, a stop state detector for detecting the stopped state of the vehicle, and a controller for controlling the engine, the motor-generator and the first clutch. When the stopped state is detected by the stop state detector, the controller releases the first clutch, interrupts the feed of fuel to the engine, and feeds electric power to the motor-generator to drive the motor-generator to thereby hold the rotation of the engine substantially at an idling RPM.

12 Claims, 19 Drawing Sheets

FIRST POWER MODE

FIRST POWER TRAIN

IDLING MODE "P, N" RANGE

FIG. 13(a)

| E/G | Ci | Cd | M/G | C0 | B0 | F0 | C1 | C2 | B1 | B2 | B3 | F1 | F2 |
|---|---|---|---|---|---|---|---|---|---|---|---|---|---|
| IDLE | ○ | × | × | × | × | × | × | × | × | × | × | × | × |

"R" RANGE

FIG. 13(b)

| E/G | Ci | Cd | M/G | C0 | B0 | F0 | C1 | C2 | B1 | B2 | B3 | F1 | F2 |
|---|---|---|---|---|---|---|---|---|---|---|---|---|---|
| IDLE | ○ | × | × | ○ | × | ○ | × | ○ | × | × | ○ | × | × |

"D (2,L)" RANGE

FIG. 13(c)

| E/G | Ci | Cd | M/G | C0 | B0 | F0 | C1 | C2 | B1 | B2 | B3 | F1 | F2 |
|---|---|---|---|---|---|---|---|---|---|---|---|---|---|
| IDLE | ○ | × | × | ○ | × | ○ | ○ | × | × | × | × | × | ○ |

MOTORING MODE "P, N" RANGE

FIG. 13(d)

| E/G | Ci | Cd | M/G | C0 | B0 | F0 | C1 | C2 | B1 | B2 | B3 | F1 | F2 |
|---|---|---|---|---|---|---|---|---|---|---|---|---|---|
| FC | ○ | ○ | M | × | × | ○ | × | × | × | × | × | × | × |

"D (2,L)" RANGE

FIG. 13(e)

| E/G | Ci | Cd | M/G | C0 | B0 | F0 | C1 | C2 | B1 | B2 | B3 | F1 | F2 |
|---|---|---|---|---|---|---|---|---|---|---|---|---|---|
| FC | ○ | × | M | ○ | × | ○ | ○ | × | × | × | × | × | ○ |

GENERATING MODE "P, N" RANGE

FIG. 13(f)

| E/G | Ci | Cd | M/G | C0 | B0 | F0 | C1 | C2 | B1 | B2 | B3 | F1 | F2 |
|---|---|---|---|---|---|---|---|---|---|---|---|---|---|
| GENERATION POINT | ○ | ○ | G | × | × | ○ | × | × | × | × | × | × | × |

"D (2,L)" RANGE

FIG. 13(g)

| E/G | Ci | Cd | M/G | C0 | B0 | F0 | C1 | C2 | B1 | B2 | B3 | F1 | F2 |
|---|---|---|---|---|---|---|---|---|---|---|---|---|---|
| GENERATION POINT | ○ | × | G | ○ | × | ○ | ○ | × | × | × | × | × | ○ |

SECOND POWER TRAIN

*IDLING MODE*
*"P, N" RANGE*

FIG. 14(a)

| E/G | Ci | Cd | Br | M/G | C0 | B0 | F0 | C2 | B1 | B3 | F2 |
|---|---|---|---|---|---|---|---|---|---|---|---|
| IDLE | ○ | × | × | × | × | × | × | × | × | × | × |

*"R" RANGE*

FIG. 14(b)

| E/G | Ci | Cd | Br | M/G | C0 | B0 | F0 | C2 | B1 | B3 | F2 |
|---|---|---|---|---|---|---|---|---|---|---|---|
| IDLE | × | × | ○ | × | ○ | × | × | × | × | ○ | × |

*"D (2,L)" RANGE*

FIG. 14(c)

| E/G | Ci | Cd | Br | M/G | C0 | B0 | F0 | C2 | B1 | B3 | F2 |
|---|---|---|---|---|---|---|---|---|---|---|---|
| IDLE | ○ | × | × | × | ○ | × | ○ | × | × | × | ○ |

*MOTORING MODE*
*"P" RANGE*

FIG. 14(d)

| E/G | Ci | Cd | Br | M/G | C0 | B0 | F0 | C2 | B1 | B3 | F2 |
|---|---|---|---|---|---|---|---|---|---|---|---|
| FC | ○ | × | × | M | × | ○ | × | ○ | × | × | × |

*"D (2,L)" RANGE*

FIG. 14(e)

| E/G | Ci | Cd | Br | M/G | C0 | B0 | F0 | C2 | B1 | B3 | F2 |
|---|---|---|---|---|---|---|---|---|---|---|---|
| FC | ○ | × | × | M | ○ | × | ○ | × | × | × | ○ |

*GENERATING MODE*
*"P" RANGE*

FIG. 14(f)

| E/G | Ci | Cd | Br | M/G | C0 | B0 | F0 | C2 | B1 | B3 | F2 |
|---|---|---|---|---|---|---|---|---|---|---|---|
| GENERATION POINT | ○ | × | × | G | × | ○ | × | ○ | × | × | × |

*"D (2,L)" RANGE*

FIG. 14(g)

| E/G | Ci | Cd | Br | M/G | C0 | B0 | F0 | C2 | B1 | B3 | F2 |
|---|---|---|---|---|---|---|---|---|---|---|---|
| GENERATION POINT | ○ | × | × | G | ○ | × | ○ | × | × | × | ○ |

MOTORING MODE

GENERATING MODE

FIG. 19 ORDINARY BRAKING (Hold Mode OFF)

HOLD MODE (for Holding Brake Oil Pressure)

CONTROL SYSTEM FOR A VEHICULAR DRIVE UNIT

BACKGROUND OF THE INVENTION

1. Field of the Invention

The invention relates to a vehicular drive unit and, more particularly, to a control system for holding the vehicular drive unit in a quickly restartable state when the vehicle stops.

2. Description of the Related Art

One type of the vehicular drive unit is exemplified by the drive unit in which an internal combustion engine (called an "engine" henceforth), a motor-generator and a transmission are combined, as disclosed in U.S. Pat. Nos. 4,533,011 and 5,285,111. This type drive unit uses the motor-generator as a generator and recovers the braking energy from the wheels. It stores the braking energy as an electric power to be used to start the engine or to drive the vehicle by driving the motor-generator. When the vehicle is stopped, moreover, the device interrupts the feed of fuel to the engine thereby to reduce the fuel consumption rate and the discharge of exhaust gases.

In the drive unit thus structured, when the vehicle stops, the feed of fuel to the engine is interrupted to stop the rotation of the engine so that the accessories, such as an air conditioner or an alternator that are driven by the engine, cannot be operated. When the vehicle is to again start to move from the stopped state, on the other hand, the start of movement is delayed because it takes a considerable time for the engine to reach either a predetermined idling RPM or an RPM corresponding to the throttle opening after the engine is started.

SUMMARY OF THE INVENTION

It is, therefore, a first object of the invention to provide a control system for a vehicular drive unit, which can drive the accessories while reducing the discharge of exhaust gases and which prevents the delay in starting movement by interrupting the feed of fuel to the engine, by driving the engine using the motor-generator to thereby maintain the engine in the idling state, and to improve the mileage by recovering the braking energy and making it usable at the running time of the vehicle.

When the engine is driven by the motor-generator, as above, so that it may be held in the idling state, an excessively long stop time of the vehicle may lead to an excessive consumption of electric power. It is, therefore, a second object of the invention to prevent excessive power consumption by changing the control mode in accordance with the stop time period of the vehicle.

When, moreover, the engine is driven by the motor-generator, as above, so that it may be held in the idling state, the residue of electric power in the battery may be reduced to such an extent as not to be able to restart the engine if the holding control is executed with an insufficient residue of battery power. It is, therefore, a third object of the invention to prevent the excessive consumption of the electric power by releasing the aforementioned control in accordance with the residue of battery power.

Some vehicles are equipped with a power steering device, which also is a high electric power consumer. Moreover, it seems the power steering device acts at the preparation for a start of movement of the vehicle. It is, therefore, a fourth object of the invention to make the start smoother while preventing the excessive consumption of electric power by releasing the aforementioned control at the time of operating the power steering device.

Moreover, the vehicle is usually equipped, in its exhaust system, with a catalyst for purifying the exhaust gases. The catalyst is functionally degraded when the temperature is low. Thus, the control, as described above with respect to the first object, is not desirable when the catalyst temperature is low. It is, therefore, a fifth object of the invention to retain the catalyst function by releasing the control in accordance with the catalyst temperature.

Incidentally, the rotary portion of the motor-generator usually has a considerable inertial mass. If the control is made to switch the drive state quickly from that by the motor-generator to that by the engine, the inertial rotation of the motor-generator is transmitted by the engagement of the first clutch to cause a heavy shock in the drive drain in the stopped state. It is, therefore, a sixth object of the invention to execute a control for preventing such a shock.

Moreover, the transmission mechanism is equipped, if an automatic one, with a fluid coupling having a lockup clutch for improving the start and the mileage. It is, therefore, an seventh object of the invention to prevent the loss in the fluid coupling at the engine drive time by the motor-generator by controlling the lockup clutch.

A eighth object of the invention is to lighten the engine load at the generating time by the motor-generator in the automatic transmission equipped with the fluid coupling having the aforementioned lockup clutch.

A ninth object of the invention is to apply the motoring control to the transmission mechanism which has a planetary gear unit for connecting the engine and the motor-generator.

In order to achieve the aforementioned first object, according to the invention, there is provided a control system for a vehicular drive unit comprising an engine; a motor-generator connected to the output shaft of the engine for acting as a motor and a generator; a battery for storing the energy recovered by the motor-generator as electric power and for feeding electric power to drive the motor-generator; a first clutch for connecting the motor-generator and the wheels; stop state detecting means for detecting the stopped state of the vehicle; and control means for controlling the engine, the motor-generator and the first clutch, wherein when the stopped state of the vehicle is detected by the stop state detecting means, the control means releases the first clutch, interrupts the feed of fuel to the engine, and feeds electric power to the motor-generator to drive the motor-generator thereby to hold the rotation of the engine substantially at an idling RPM. This control will be called the "motoring control."

In order to achieve the aforementioned second object, moreover, the control means includes stop time metering means for metering the stop time period of the vehicle and to hold the rotation of the engine at a predetermined RPM smaller than an idling RPM when the stop time period is greater than a predetermined value.

In order to achieve the aforementioned third object, moreover, the control system further comprises residue detecting means for detecting the electric power residue of the battery and, when the stopped state of the vehicle is detected by the stop state detecting means and when the residue of the battery detected by the residue detecting means is greater than the predetermined value, the control means releases the first clutch, interrupts the feed of fuel to the engine and feeds electric power to the motor-generator to bring the motor-generator into a drive state thereby to hold the rotation of the engine substantially at the idling RPM.

In order to achieve the aforementioned fourth object, moreover, the control system further comprises a power steering switch for detecting the action of the power steering and, when the stopped state of the vehicle is detected by the stop state detecting means and when it is detected by the power steering switch that the power steering is inactive, the control means releases the first clutch, interrupts the feed of fuel to the engine and feeds electric power to the motor-generator to bring the motor-generator into a drive state thereby to hold the rotation of the engine substantially at the idling RPM.

In order to achieve the aforementioned fifth object, moreover, the control system further comprises a catalyst temperature sensor for detecting a catalyst temperature and, when the stopped state of the vehicle is detected by the stop state detecting means and when the catalyst temperature detected by the catalyst temperature is greater than a predetermined value, the control means releases the first clutch, interrupts the feed of fuel to the engine and feeds electric power to the motor-generator to bring the motor-generator into a drive state thereby to hold the rotation of the engine substantially at the idling RPM.

In order to achieve the aforementioned sixth object, moreover, the control system further comprises a second clutch for connecting the engine and the motor-generator and, when the output signal detected by the brake sensor is switched from ON to OFF while the motor-generator is in the drive state, the control means reopens the feed of fuel to the engine, interrupts the drive of the motor-generator, releases the second clutch, brings the motor-generator into a generating state, and applies the first clutch.

In order to achieve the aforementioned seventh object, moreover, the control system further comprises a fluid coupling having a lockup clutch between the engine and the motor-generator and, when the stopped state of the vehicle is detected by the stop state detecting means, the control means releases the first clutch, applies the lockup clutch, interrupts the feed of fuel to the engine and feeds electric power to the motor-generator to bring the motor-generator into a drive state thereby to hold the rotation of the engine substantially at the idling RPM.

In order to achieve the aforementioned eighth object, moreover, when the output signal detected by the brake sensor is switched from ON to OFF while the motor-generator is in the drive state, the control means reopens the feed of fuel to the engine, interrupts the drive of the motor-generator, releases the lockup clutch, brings the motor-generator into a generating state, and applies the first clutch.

In order to achieve the aforementioned ninth object, the control system comprises an engine; a motor-generator acting as a motor and a generator; a planetary gear having at least three rotary elements, the first rotary element of the planetary gear connected to the output shaft of the engine, the second rotary element connected to the motor-generator to perform a reaction against the first rotary element, and the third rotary element connected to an output member for transmitting power to the wheels; a battery for storing the energy generated by the motor-generator as electric power, and for feeding electric power to drive the motor-generator; stop state detecting means for detecting a stopped state of the vehicle; and control means for controlling the engine and the motor-generator. When the stopped state of the vehicle is detected by the stop state detecting means, the control means interrupts the feed of fuel to the engine, and feeds the electric power to the motor-generator thereby to hold the rotation of the engine substantially at an idling RPM. This control will be called the "motoring mode."

The control system further comprises residue detecting means for detecting the electric power residue of the battery and, when the stopped state of the vehicle is detected by the stop state detecting means and when the residue detected by the battery residue detecting means is below a predetermined value, the control means feeds the fuel to the engine to hold the rotation of the engine at a predetermined RPM, and causes the motor-generator to generate electric power. This control will be called the "generating mode."

The control system further comprises a catalyst temperature sensor for detecting a catalyst temperature. When the stopped state of the vehicle is detected by the stop state detecting means and when the catalyst temperature detected by the catalyst temperature sensor is below a predetermined value, the control means feeds the fuel to the engine to hold the rotation of the engine substantially at an idling RPM. This control will be called the "idling mode."

The control system further comprises brake control means for controlling the oil pressure of a brake. When the vehicle is in the stopped state, the brake control means holds the brake oil pressure above a predetermined value.

According to the invention, at the stop of the vehicle, the feed of fuel to the engine is interrupted so that the mileage can be improved while reducing the discharge of exhaust gases. Moreover, the engine at the vehicle stop is driven by the motor-generator so that the accessories to be driven by the engine can also be operated. In addition, the electric power necessary for driving the motor-generator is supplied by recovering the braking energy so that the battery can be managed to have the necessary minimum power capacity. On the other hand, the engine is held substantially at the idling RPM even when the fuel is cut, so that a delay in the start-up of the vehicle can be eliminated.

According to the invention, moreover, when the stop time period for the vehicle is long, the rotation of the engine is held at an RPM lower than the idle RPM so that the power consumption for driving the motor-generator can be suppressed to a low level.

Moreover, the control for driving the engine by motor-generator is executed only when the residue of the electric power in the battery is sufficient. As a result, the motor-generator is not driven when the residue of the battery power is low, so that the battery can be prevented from being exhausted by reducing the power residue.

Further, unnecessary control is avoided after the steering wheel is moved in preparation for starting the vehicle, so that the start is smoother and a conflict between control and the operation of the power steering device, which has a high power consumption is prevented.

Further, the engine is warmed by the fuel feed so that the catalyst function can be brought to the steady state to prevent the discharge of the exhaust gases.

Moreover, when the brake is released during the control, the drive of the engine is switched from that by the motor-generator to that by the fuel feed so that the restart is smooth. On the other hand, the rotor of the motor-generator has such a considerable mass that its rotation is continued by the inertial force even after the drive by the motor-generator is stopped. If the first clutch is applied in such a state, the transmission is stopped causing an application shock. Therefore, the inertial force is absorbed by causing the motor-generator to generate the electric power, and the shock at the application of the first clutch can be eliminated by stopping the motor-generator. Moreover, the inertial force can be absorbed to store the energy.

Additionally, in case where the fluid coupling is interposed between the engine and the motor-generator, the engine and motor-generator can be directly connected by applying the lockup clutch, thereby eliminating the loss for driving the engine by the motor-generator. As a result, it is possible to minimize the electric power necessary to drive the motor-generator.

In the structure having the fluid coupling, the load to be exerted upon the engine when the motor-generator generates power with the lockup clutch applied can be lightened to suppress the consumption rate of the fuel.

Further, during stopping of the vehicle, the fuel feed to the engine is interrupted so that the fuel consumption rate and the exhaust gases can be reduced. Moreover, the engine is held substantially at the idling RPM by the motor-generator so that the accessories to be driven by the engine can be operated.

If the motoring mode is continued for a long time, the stored capacity of the battery, as the power source for the motor-generator, will be exhausted to deteriorate the performance and shorten the life of the battery. Therefore, when the residue of the battery, as detected by the battery residue detecting means, is below the predetermined value, the mode is switched to the generating mode in which fuel is fed to the engine so that the motor-generator is caused to generate electric power. As a result, the stored capacity of the battery can be held above the predetermined value to improve the performance and lengthen the life of the battery.

In the motoring mode, the catalyst temperature drops, deteriorating the catalyst activity, so that the exhaust gases are possibly degraded when the engine is restarted. Therefore, when the catalyst temperature, as detected by the catalyst temperature sensor, is below the predetermined value, the mode is switched to the idling mode in which the fuel is fed to the engine to hold the engine substantially at the idling RPM. As a result, the catalyst temperature is prevented from dropping and thereby preventing the degradation of the exhaust gases.

For a forward running range, in the motoring mode, the third rotary element connected to the output member is stopped because the driver depresses the brake pedal. Moreover, the motor-generator connected to the second rotary element outputs the torque to rotate the second rotary element backward so that the first rotary element acting as the reaction member is rotated forward to retain the engine substantially at the idling RPM. As a result, the third rotary element is subjected to the torque for rotating it backward (or counter-clockwise), by the torque of the motor-generator, so that a creep is caused in the vehicle to complicate the braking operation of the driver.

In the generating mode, on the other hand, the third rotary element connected to the output member is stopped because the driver depresses the brake pedal. Moreover, the first rotary element is rotated forward because the engine is held substantially at the idling RPM by the fuel feed. On the other hand, the second rotary element is rotated backward. As a result, the third rotary element is always subjected to the forward (or clockwise) torque from the engine so that a creep is caused in the vehicle to complicate the braking operation for the driver.

Thus, the brake control means holds the brake oil pressure above a predetermined level when the vehicle is at a stop so that a complicated braking operation for the driver can be prevented.

BRIEF DESCRIPTION OF THE DRAWINGS

The invention will now be described with reference to the figures, in which:

FIGS. 13(a)–13(g) are tables showing the various operations of the first power train shown in FIG. 11;

FIGS. 14(a)–14(g) are tables showing the various operations of the second power train shown in FIG. 12;

DESCRIPTION OF THE PREFERRED EMBODIMENTS

Figure 1:
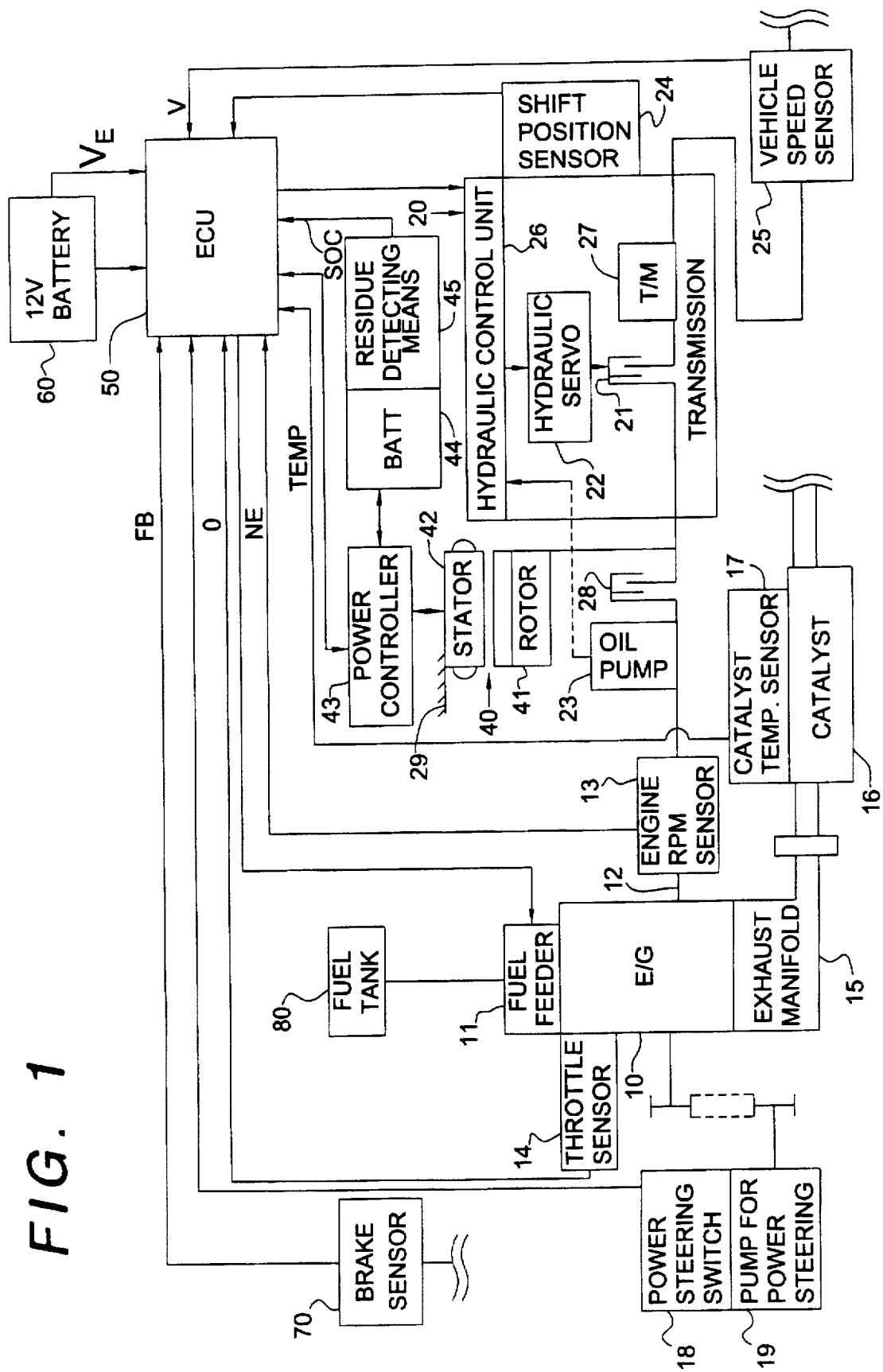
FIG. 1 is a block diagram schematically showing the structure of a vehicular drive unit according to a first mode of an embodiment of the invention.

The modes of the embodiment of the invention will be described with reference to the accompanying drawings. The vehicular drive unit is structured, as schematically shown in FIG. 1, to include an engine (E/G) 10; a motor-generator 40 connected to the output shaft 12 of the engine 10 for acting as a generator to recover the energy from the wheels (not shown) and as a motor to drive the output shaft 12 of the engine 10; a battery (BATT) 44 for storing the energy recovered by the motor-generator 40 as electric power and for feeding electric power to drive the motor-generator 40; stop state detecting means (comprising a vehicle speed sensor 25, a brake sensor 70, a throttle sensor 14, and a control means 50) for detecting the stopped state of the vehicle; and the control means (ECU) 50 for controlling the engine 10, the motor-generator 40 and a first clutch 21.

The control means 50 performs control, when the stopped state is detected by the stop state detecting means, to release the first clutch 21, to interrupt the feed of fuel to the engine 10, and to feed electric power to the motor-generator 40 thereby to bring it into a drive state so that the engine 10 may be held generally at the idling RPM. This control will be called the "motoring control."

The vehicular drive unit further includes the vehicle speed sensor 25 for detecting a vehicle speed (V); the brake sensor 70 for detecting the operated state (FB) of the brake; and the throttle sensor 14 for detecting a throttle opening (θ), all of which make up the detection portion of the stop state detecting means. The stop state detecting means detects the stopped state of the vehicle when the vehicle speed (V) detected by the vehicle speed sensor 25 is substantially zero, when the operation state, i.e., the depression (FB) detected by the brake sensor 70 is the brake ON, and when the throttle opening (θ) detected by the throttle sensor 14 is fully closed.

The control means 50 has stop time metering means for metering the stopped time of the vehicle to hold the rotation of the engine 10 at a predetermined RPM less than the idling RPM when the stop time exceeds a predetermined value, such as 5 minutes or a similar value, to enhance performance for the engine used. This control will be called the "drooping control."

The system further includes residue detecting means 45 for detecting the residue of electricity (as will be called the "residue" in the description of the modes of embodiments) of the battery 44. The control means 50 performs, when the stopped state of the vehicle is detected by the stop state detecting means and when the residue of the battery detected by the residue detecting means 45 is over a predetermined value, motoring control to release the first clutch 21, to stop the feed of fuel to the engine 10 and to feed the electric power to the motor-generator 40 to thereby bring the motor-generator to the drive state so that the rotation of the engine 10 may be held substantially at the idling RPM.

The system further includes a power steering switch 18 for detecting the action of the power steering (not shown). The control means 50 performs, when the stopped state of the vehicle is detected by the stop state detecting means and when it is detected by the power steering switch 18 that the power steering is out of operation, motoring control to release the first clutch 21, to stop the feed of fuel to the engine 10 and to feed the electric power to the motor-generator to thereby bring the motor-generator 40 into the drive state so that the rotation of the engine 10 is held substantially at the idling RPM.

The system further includes a catalyst temperature sensor 17 for detecting the temperature of the catalyst. The control means 50 performs, when the stopped state of the vehicle is detected by the stop state detecting means and when the catalyst temperature (TEMP), detected by the catalyst sensor 17, is over a predetermined value, motoring control to release the first clutch 21, to stop the feed of fuel to the engine 10 and to feed the electric power to the motor-generator 40 to bring the motor-generator 40 into the drive state so that the rotation of the engine 10 may be held substantially at the idling RPM.

In this embodiment, the vehicle drive unit further includes a second clutch 28 for connecting the engine 10 and the motor-generator 40. When the output signal detected by the brake sensor 70 is switched from ON to OFF for the motor-generator 40 being in the drive state, the control means 50 reopens the feed of fuel to the engine 10, interrupts the drive of the motor-generator 40, releases the second clutch 28, causes the motor-generator 40 to generate electric power, and applies the first clutch 21.

The detailed structures of the individual portions will now be described. The engine 10 is equipped with a fuel feeder 11, an exhaust manifold 15 and a catalyst 16 in the exhaust system leading from the exhaust manifold 15. The fuel feeder 11 is connected to a fuel tank 80 so that the fuel to be fed from the fuel tank 80 to the engine 10 is controlled by a signal coming from the control means 50, composed of a control computer. Within the engine 10 is the throttle opening sensor 14 which is also connected with the control means 50 to which its signal is output. The catalyst temperature sensor 17 is arranged in association with the catalyst 16 and is also connected with the control means 50 to which its signal is output. A pump 19, for the power steering, is connected to the engine 10 through a transmission mechanism (unnumbered). The power steering switch 18, in this embodiment a pressure switch, is arranged in association with the pump 19 and is so connected with the control means 50 that its signal can also be output thereto. An engine RPM sensor 13 is arranged in association with the output shaft 12 of the engine 10 and is so connected with the control means 50 that its signal can also be output thereto.

An oil pump 23, forming the oil pressure source of a transmission 20, is arranged in connection with the output shaft 12 of the engine 10 and is connected via an oil line to a hydraulic control unit 26. A transmission mechanism 27 of the transmission 20 is connected through the first clutch 21 to the input shaft of the transmission 20 which is connected, in the present embodiment through a second clutch 28, to the output shaft 12 of the engine 10. In association with the first clutch 21, there is arranged a hydraulic servo 22 for applying/releasing the first clutch 21. The hydraulic servo 22 is connected, via an oil line, to the hydraulic control unit 26 so that it can feed the oil pressure. The second clutch 28, of the present embodiment, is similar to the first clutch 21. The hydraulic servo for the second clutch 28 is not shown to simplify the diagram, but the clutch 28 can be modified to a lockup clutch that is positioned in the fluid coupling of a torque converter.

The motor-generator 40 includes a stator 42 fixed in a transmission case 29, and a rotor 41 made rotatable in the stator 42. The rotor 41 is connected to the input shaft of the transmission 20. The battery 44, forming the power source of the motor-generator 40, is arranged separately of a 12V battery 60 that is the power source for the control means 50 and is, for example, a battery having a voltage as high as 240 V for starting the vehicle using the motor-generator 40. The battery 44 and the motor-generator 40 are connected to each other through a power controller 43 which is controlled by a signal from the control means 50. The residue detecting means 45 is arranged in association with the battery 44 and is connected to the control means 50 so that its signal is output to the control means.

In FIG. 1, reference numeral 24 designates a shift position sensor, combined of a neutral start switch or the like, for detecting the selected position of the transmission 20, and, as described above, numeral 25 designates the vehicle speed sensor that detects the RPM of the output shaft of the transmission 20. These sensors are so connected with the control means 50 that their signals are output thereto. Moreover, the hydraulic control unit 26 is also connected with the control means 50 so that a control signal may be input to the solenoid within the hydraulic control unit 26.

Figure 2:
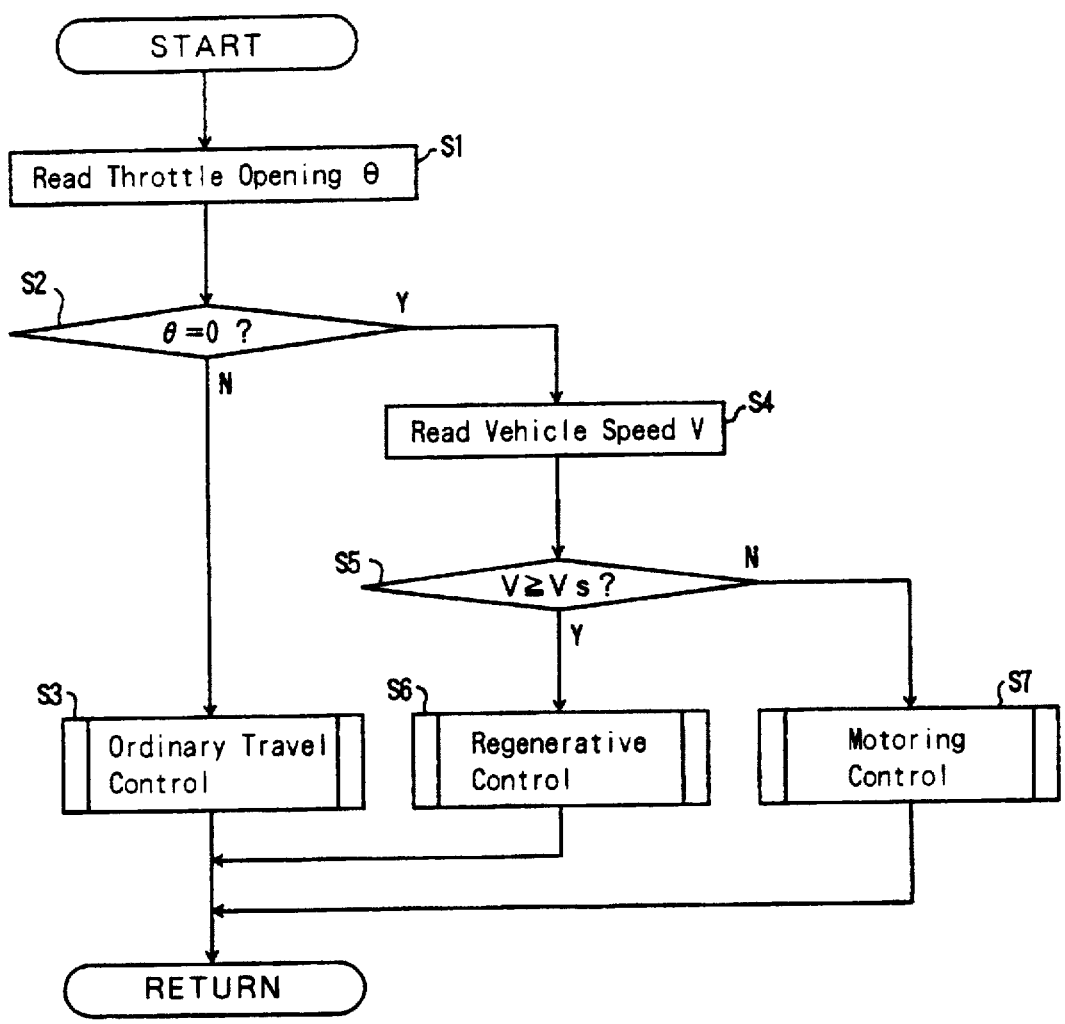
FIG. 2 is a flow chart showing the main routine of the control process for a control system of the mode of the embodiment.

Next, the control of the system thus structured will be described with reference to the flow charts of FIGS. 2 to 5. The main control routine of FIG. 2 is started at Step S1 by reading the throttle opening θ. Next, it is determined at Step S2 whether the throttle opening θ is 0. If the determination is NO, the control executed at Step S3 is the subroutine for ordinary travel control. If the determination at Step S2 is that the throttle opening θ is 0, the vehicle speed V is read at Step S4. At Step S5, it is determined if the vehicle speed V is over a predetermined value Vs. If V≧Vs, then it is determined that the vehicle is coasting and the routine enters the subroutine for regenerative control, Step S6, for achieving an engine braking effect. If, on the other hand, the decision of Step S5 reveals that the vehicle speed V is below the predetermined value Vs, then it is determined that the vehicle is stopped, and the routine executes the subroutine for motoring control, Step S7.

Because the ordinary travel control of Step S3 is not especially different from the control of the ordinary automatic transmission, the description of its content will be omitted, and the following description will be limited to the motoring control of Step S7 and the regenerative control of Step S6.

Figure 3:
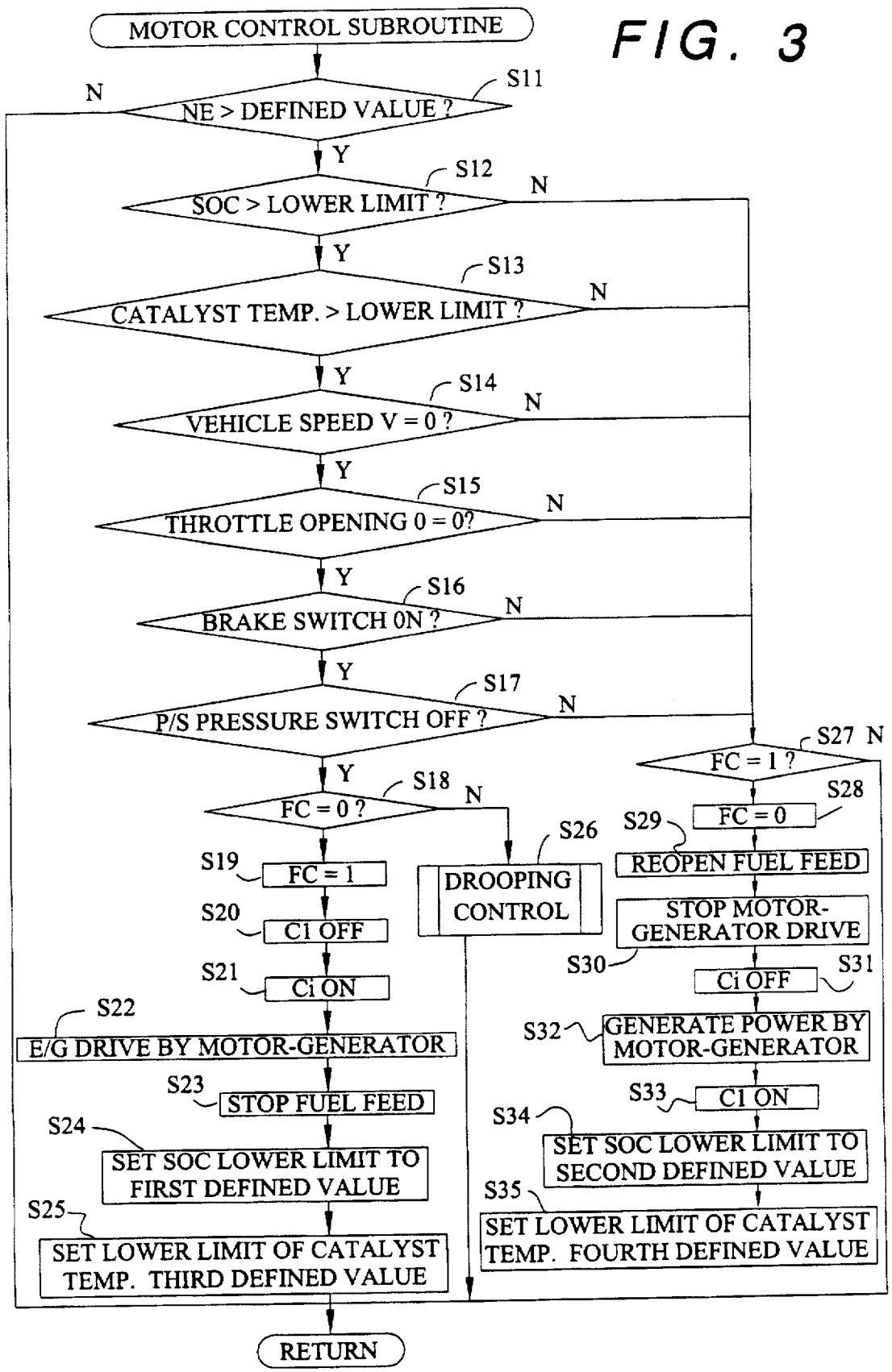
FIG. 3 is a flow chart showing a motoring control subroutine in the main routine.

In FIG. 3, showing the motoring control subroutine, it is determined at Step S11 whether the engine RPM (NE) is greater than a defined value. Then, it is determined at Step S12 whether the battery residue (SOC) is over a defined value; at Step S13 whether the catalyst temperature is over a lower limit; at Step S14 whether the vehicle speed V is substantially 0; at Step S15 whether the throttle opening θ is 0 (in the fully closed state); at Step S16, by the brake sensor, whether the brake pedal is depressed (or ON); and at Step S17 whether a power steering switch (P/S) is ON (that is, the vehicle is being steered).

If the determination at Steps S11–S17 is yes in each case, at Step S18, a flag FC for indicating whether at the present time motoring control is being executed (FC=1 if it is) is examined. Since the flag FC=0 at first, the flag FC is set to FC=1 at Step S19, and the motoring control is started. At Step S20, the first clutch (C1) 21 is released (or OFF). At Step S21, the second clutch (Ci) is applied (or ON). At Step S22, electric power is fed to the motor-generator 40 from the battery 44 to establish the drive state so that the engine (E/G) 10 is driven and held generally at the idling RPM. At Step S23, the feed of fuel to the engine is interrupted. At Step S24, the lower limit of the residue (SOC) of the battery 44 is set to a first defined value, such as 60%. At Step S25, the lower limit of the catalyst temperature is set to a third defined value, such as 750° C. Thus, the motoring control is entered. In the subsequent routine, the subroutine for drooping control, to be described later, is entered at Step S26 when FC=1 at Step S18.

If any of the decisions of Steps S12 to S17 is NO, it is decided at Step S27 whether the flag FC=1. if it does, at Step S28, the flag FC is set to FC=0 (inhibiting the motoring control). At Step S29, the feed of fuel to the engine 10 is reopened. At Step S30, the feed of electric power to the motor-generator 40 is interrupted to stop the drive. At Step S31, the second clutch (Ci) 28 is released (or OFF). At Step S32, the motor-generator 40 is brought into a generating state to absorb the inertial force of the rotor 41. At Step S33, the rotor 41 is stopped, and the first clutch (C1) is then applied (or ON). At Step S34, the lower limit of the residue (SOC) of the battery 44 is set to a second defined value, such as 70%. At Step S35, the lower limit of the catalyst temperature (TEMP) is set to a fourth defined value, such as 800° C.

Figure 4:
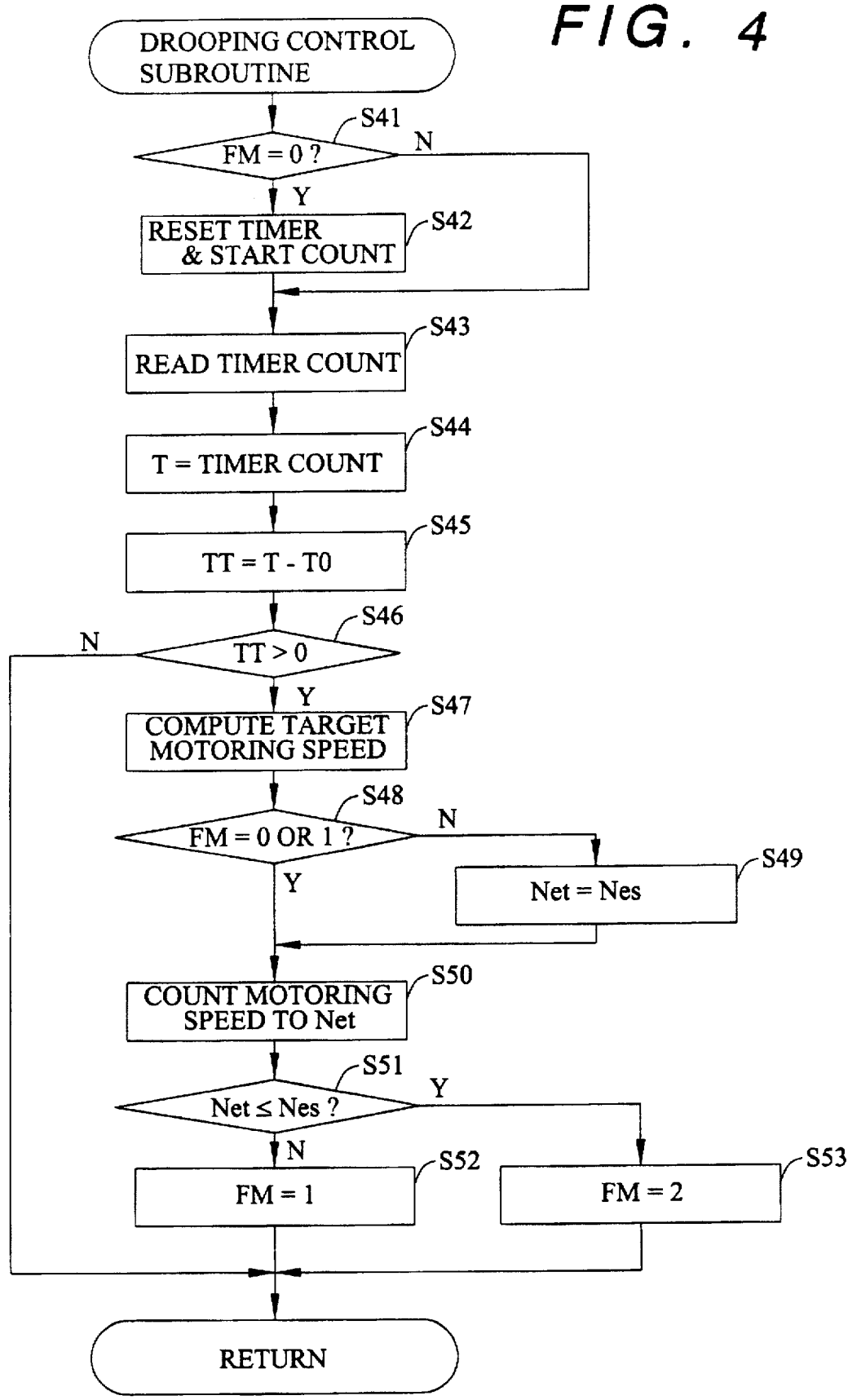
FIG. 4 is a flow chart showing a drooping control subroutine in the motoring control subroutine.

In the subroutine for the drooping control, shown in FIG. 4, on the other hand, it is determined at Step S41 whether a flag FM indicating that the drooping control is being executed is 0 (FM=1 indicates that the control is being executed). If FM=0, then, at Step S42, a timer, which meters the stop time of the vehicle is reset, and the count is started. At Step S43, the timer count is read. At Step S44, the counted value of the timer, as read at T, is input. At Step S45, TT=T−T0 is determined (wherein T0 indicates a set value, such as 5 minutes, for deciding whether the stop time is long). At Step S46, it is decided whether TT, determined in Step S45, is positive. If positive, it is decided that the stop time is long. If negative, the stop time is so short that the drooping control is not executed, but the engine 10 is held substantially at the idling RPM. When the stop time is long, i.e., TT>0, at Step S47, the target speed (Net) of the motor-generator 40 is computed so the RPM of the engine 10 may be lowered by the drooping control. The formula for this computation is expressed by Net=Nei−T×Neo (wherein Nei (idling RPM, with a value such as 600 RPM based on engine type) and Neo (b/a, see FIG. 8) are constants). At Step S48, it is determined whether the flag FM is 0 or 1.

If the result of Step S48 is NO, the target speed (Net) of the motor-generator 40 is set at Step S49 to a lower limit (Nes) (which is at about 500 rpm for the control computer (ECU) 50 not to identify as an engine stall). At Step S50, the speed of the motor-generator 40 is controlled to the target speed (Net). At Step S51, it is determined whether the target speed (Net) is below the lower limit (Nes). If the decision of Step S51 is NO, the flag FM is set, at Step S52, to 1 (at FM=1, the RPM of the engine is still over the lower limit so that the drooping control continues to be executed). If, on the other hand, the result of Step S51 is YES, the flag FM is set, at Step S53, to 2 (at FM=2, the RPM of the engine is at the lower limit so that it cannot be lowered further, and is subsequently held at the lower limit). Here, the predetermined RPM takes the sum of the RPM, at which the control computer (ECU) 50 identifies as a stall of the engine 10, and an allowance.

Figure 5:
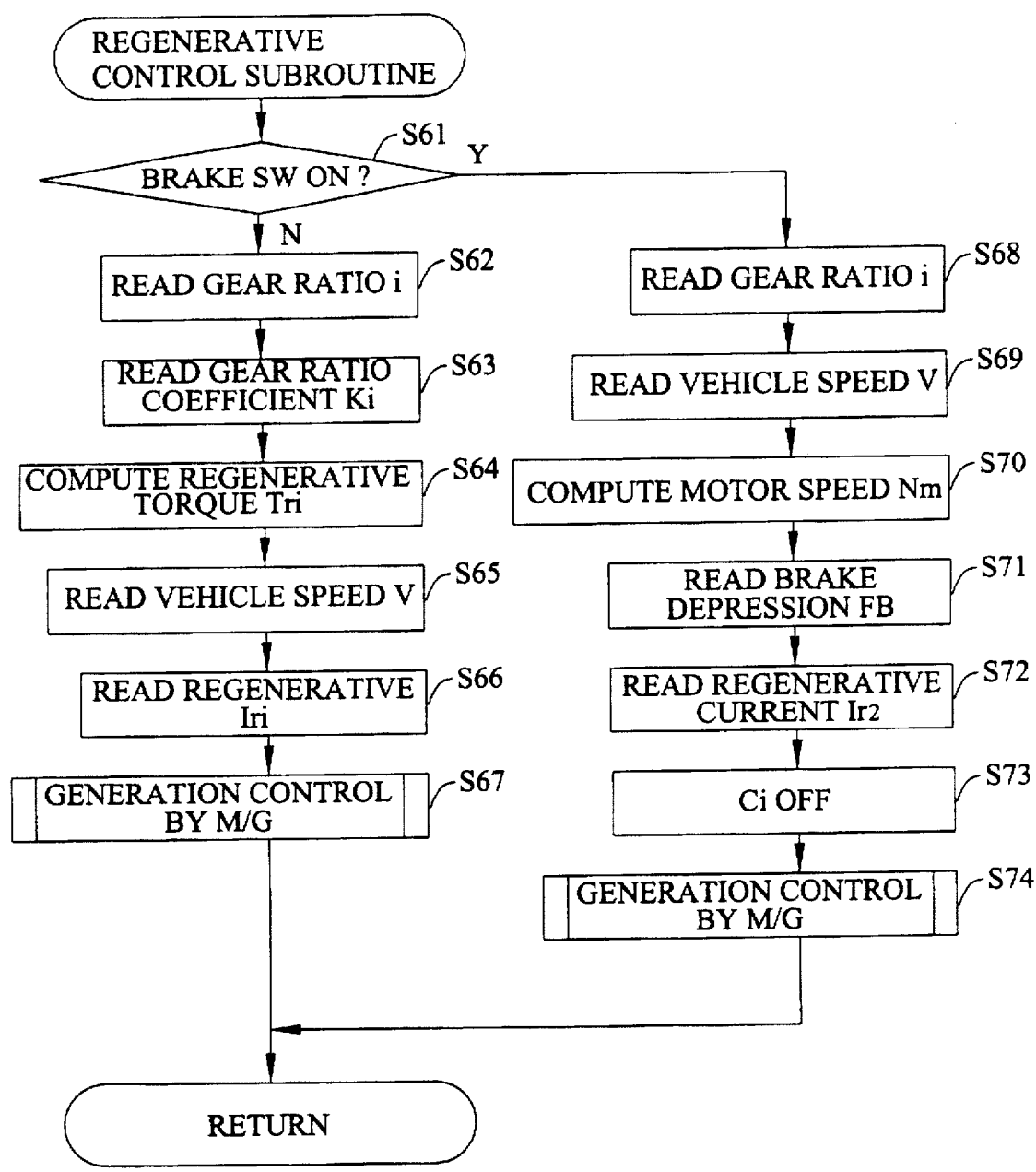
FIG. 5 is a flow chart showing a regenerative control subroutine in the main routine.

In the regenerative control subroutine, shown in FIG. 5, it is determined, at Step S61, from the output of the brake sensor 70, whether the brake is depressed. If the brake is not depressed, an energy corresponding to the engine braking is regenerated. If the brake is depressed, on the other hand, an energy corresponding to the depression of the brake is regenerated. If the brake is not depressed, at Step S62, the gear ratio i of the transmission mechanism 27 is read. At Step S63, a gear ratio coefficient Ki is read. This gear ratio coefficient Ki is a constant determined according to the gear ratio i. At Step S64, a regenerative torque Tri is computed. The formula for this computation is expressed by Tri=Ki× Tro (where Tro is torque which is defined in terms of a size of the vehicle, engine and power train and is equal to the engine brake of the vehicle or a constant). At Step S65, the vehicle speed V is read. At Step S66, a regenerative current Ir1 is computed from the regenerative torque Tri and the vehicle speed V. At Step S67, the motor-generator (M/G) 40 is caused to generate the electric power so as to charge the regenerative current Ir1.

If, at Step S61, on the other hand, it is determined that the brake has been depressed, the gear ratio i of the transmission is read at Step S68. At Step S69, the vehicle speed V is read. At Step S70, the speed Nm of the motor-generator 40 is computed. At Step S71, the depression (FB) of the brake is determined based on the output of the brake sensor 70. At Step S72, a regenerative current Ir2 is computed from the gear ratio i, the speed Nm of the motor-generator 40 and the depression (FB) of the brake. At Step S73, moreover, the second clutch (Ci) is released (OFF). Finally, at Step S74, the motor-generator 40 is caused to generate the electric power so as to charge the regenerative current Ir2.

Figure 6:
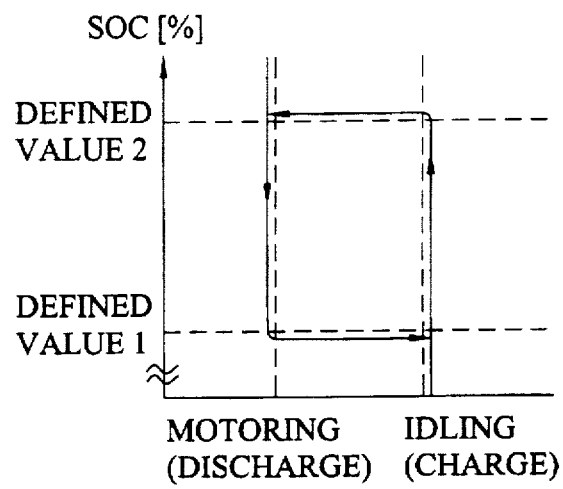
FIG. 6 is an explanatory diagram showing one example of a method of setting the lower limit of the battery residue in the mode of the embodiment.

We will now describe a method of setting the two defined values (SOC1 and SOC2), relating to the lower limit of the residue (SOC), of the battery being controlled, as described above. These values are defined as percentages to the complete charge (as metered in the present embodiment as the time product of the current to flow) and are given the hysteresis effect, as shown in FIG. 6. In the case of discharge by motoring, the discharge is interrupted (that is, the control is released) when the residue (SOC) drops to reach a first defined value (SOC) or the lower limit. Then, the state is switched to the engine running state to start the charge by idling. When the residue is caused to reach a second defined value (SOC) by the charge over a predetermined time period, the discharge by motoring is started again. Thus, the hunting of the motoring control is prevented by setting the hysteresis within the defined values.

Figure 7:
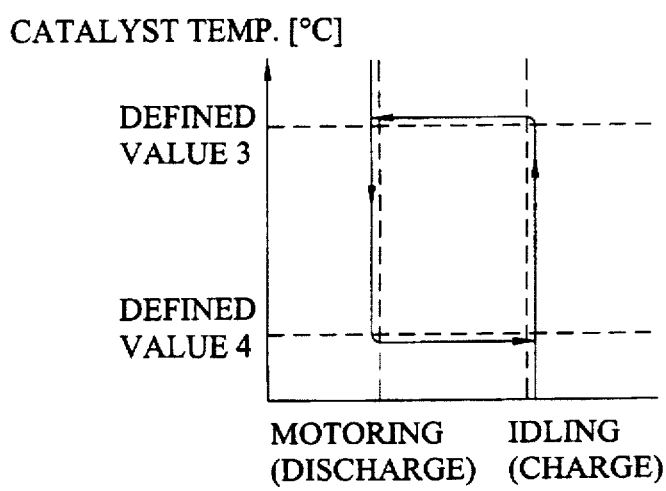
FIG. 7 is an explanatory diagram showing one example of a method of setting the lower limit of a catalyst temperature in the mode of the embodiment.

By the same reasoning, two defined values (three and four) are set for the lower limit of the catalyst temperature. In this case, too, the hysteresis effect is given as shown in FIG. 7. In motoring, more specifically, the catalyst temperature cools, and the motoring is interrupted (that is, the control is released) when the catalyst temperature reaches the third defined value, or the lower limit. As a result, the state is switched to the engine running state to start idling. When the catalyst temperature rises as the time elapses so that it reaches the fourth defined value, the motoring is started again. Thus, the hunting of the motoring control is prevented by setting the hysteresis within the defined values.

Figure 8:
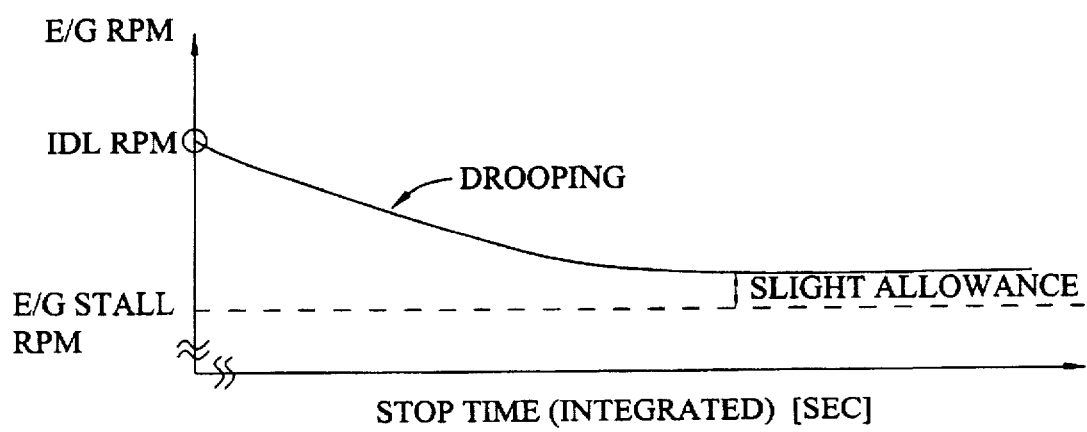
FIG. 8 is an explanatory diagram showing the detail of the drooping control in the mode of the embodiment.

The drooping control will now be described. In FIG. 8, the abscissa indicates the stop time, and the ordinate indicates the engine (E/G) RPM. The idling RPM is monitored with respect to the motoring control period for the vehicle stop. As the integrated stop time elongates, the idling RPM is lowered to a predetermined value with a slight allowance for the engine stall RPM (at which the engine is determined to stall by the control computer 50). This makes it possible to perform the motoring with suppressed power consumption for a long stop time but to smooth the restart of the engine for a short stop time.

Figure 9A:
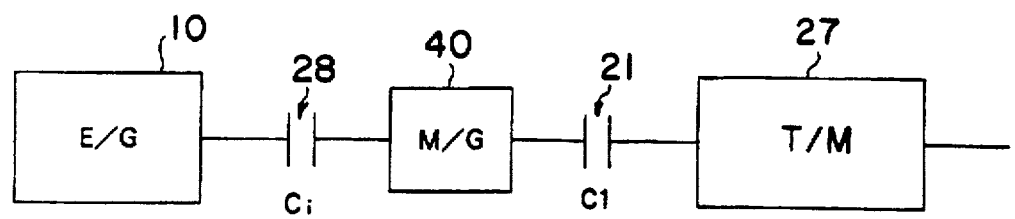
FIGS. 9(A)–9(C) are block diagrams schematically showing alternative structures of a vehicular drive unit according to alternative modes of the embodiment of the invention.
Figure 9B:
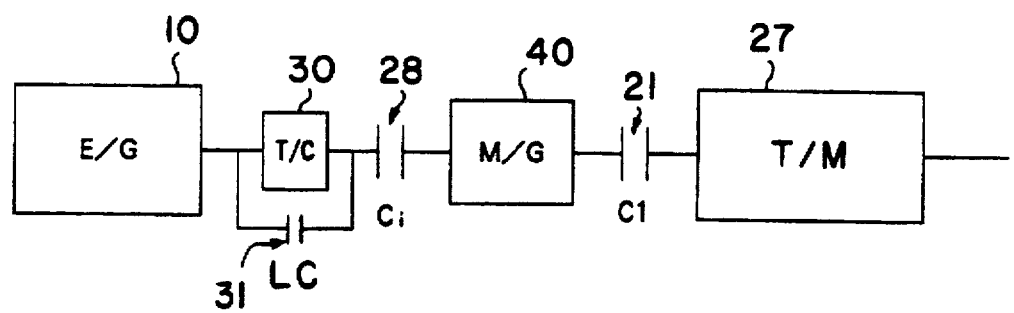
Figure 9C:
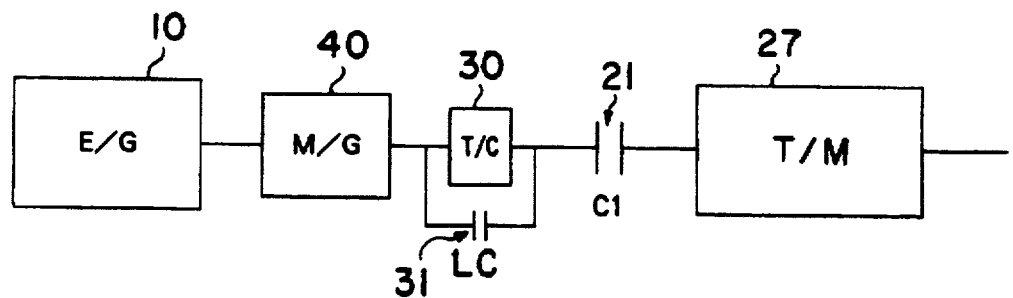

FIGS. 9(A)–9(C) are block diagrams conceptionally showing the structures of a vehicular drive unit according to alternative modes of the embodiment of the invention, in contrast with the aforementioned first mode of embodiment. FIG. 9(A) shows a first mode of the embodiment, the first clutch (C1) 21 is interposed between the motor-generator (M/G) 40 and the transmission mechanism (T/M) 27, and the second clutch (Ci) 28 is interposed between the motor-generator (M/G) 40 and the engine (E/G) 10.

On the other hand, a second mode of the embodiment shown in FIG. 9(B) is similar to the first mode of the embodiment in that the first clutch (C1) 21 is interposed between the motor-generator (M/G) 40 and the transmission mechanism (T/M) 27, but is different in that a fluid coupling (T/C) 30 having a lockup clutch (LC) 31, as exemplified by the torque converter 30, is arranged in series with the second clutch (Ci) 28 between the engine (E/G) 10 and the motor-generator (M/G) 40. With this arrangement, the motoring control is executed in which the control means releases the first clutch 21 but applies the lockup clutch 31, when the stopped state is detected by the stop state detecting means, and interrupts the feed of fuel to the engine 10 but feeds the electric power to the motor-generator 40 to bring the motor-generator 40 into the drive state thereby to hold the rotation of the engine 10 substantially at the idling RPM. This control is different from that of the first mode of the embodiment in that not only the second clutch (Ci) but also the lockup clutch 31 are applied at Step S21 in the motoring control subroutine (as shown in FIG. 3) of the first mode of the embodiment to thereby prevent the drive loss due to the slippage of the fluid in the torque converter 30, whereas not only the second clutch (Ci) 28 but also the lockup clutch 31 are released for the same reason at Step S31. Hence, the details of the individual controls according to the present embodiment will be omitted by interpreting the aforementioned Steps in the description of the foregoing embodiment. In the present embodiment, moreover, the positional relationship between the second clutch 28 and the torque converter 30, having the lockup clutch 31, may be reversed from the one shown.

With this structure, the aforementioned control is executed. When the signal output by the brake sensor 70 is switched from ON to OFF, the control means 50 reopens the feed of fuel to the engine 10, interrupts the drive of the motor-generator 40, releases the lockup clutch (LC) 31, brings the motor-generator 40 into the generating state and applies the first clutch (C1) 21 (see Steps S29 to S33 of the motoring control subroutine shown in FIG. 3).

Finally in a third mode of the embodiment, as shown in FIG. 9(C), the engine (E/G) 10 and the motor-generator (M/G) 40 are directly connected to each other, and the torque converter (T/C) 30 having the lockup clutch (LC) 31 and the first clutch (C1) 21 are arranged in series between the motor-generator 40 and the transmission mechanism (T/M). Even with this arrangement, it is possible to execute controls similar to those of the foregoing first mode of the embodiment. However, Step S21 is omitted from the motoring control subroutine; the lockup clutch (LC) 31 rather than the second clutch (Ci) 28 is released at Step S31; and the first clutch (C1) 21 is applied at Step S33 with the rotating state of the rotor 41, as decelerated at Step S32. As to the remaining steps, the description of the control of the present mode of the embodiment is supplemented by that of the first mode of embodiment.

Although the invention has been described in connection with three modes of the embodiment, it could be practiced within the scope of the claims by modifying its details in various manners. For example, the reopening of the feed of fuel to the engine when the brake is switched from ON to OFF during the motoring control may be additionally conditioned by the fact that the shift position of the automatic transmission is in a range (i.e., "R", "D", "2" or "L") other than "P" and "N". This is because the vehicle is kept in the stopped state when in the "P" or "N" range even if the brake is released or turned OFF, so that the motoring control is properly continued.

Moreover, the restart of the vehicle when the brake is switched from ON to OFF during the motoring control can be prepared for by providing the control of setting the gear stage of the automatic transmission to the second speed, as a step immediately subsequent to Step S32 in the motoring control subroutine. With this modification, it is possible to prevent an abrupt start of the vehicle.

Another mode of the embodiment of the invention will now be described.

Figure 10:
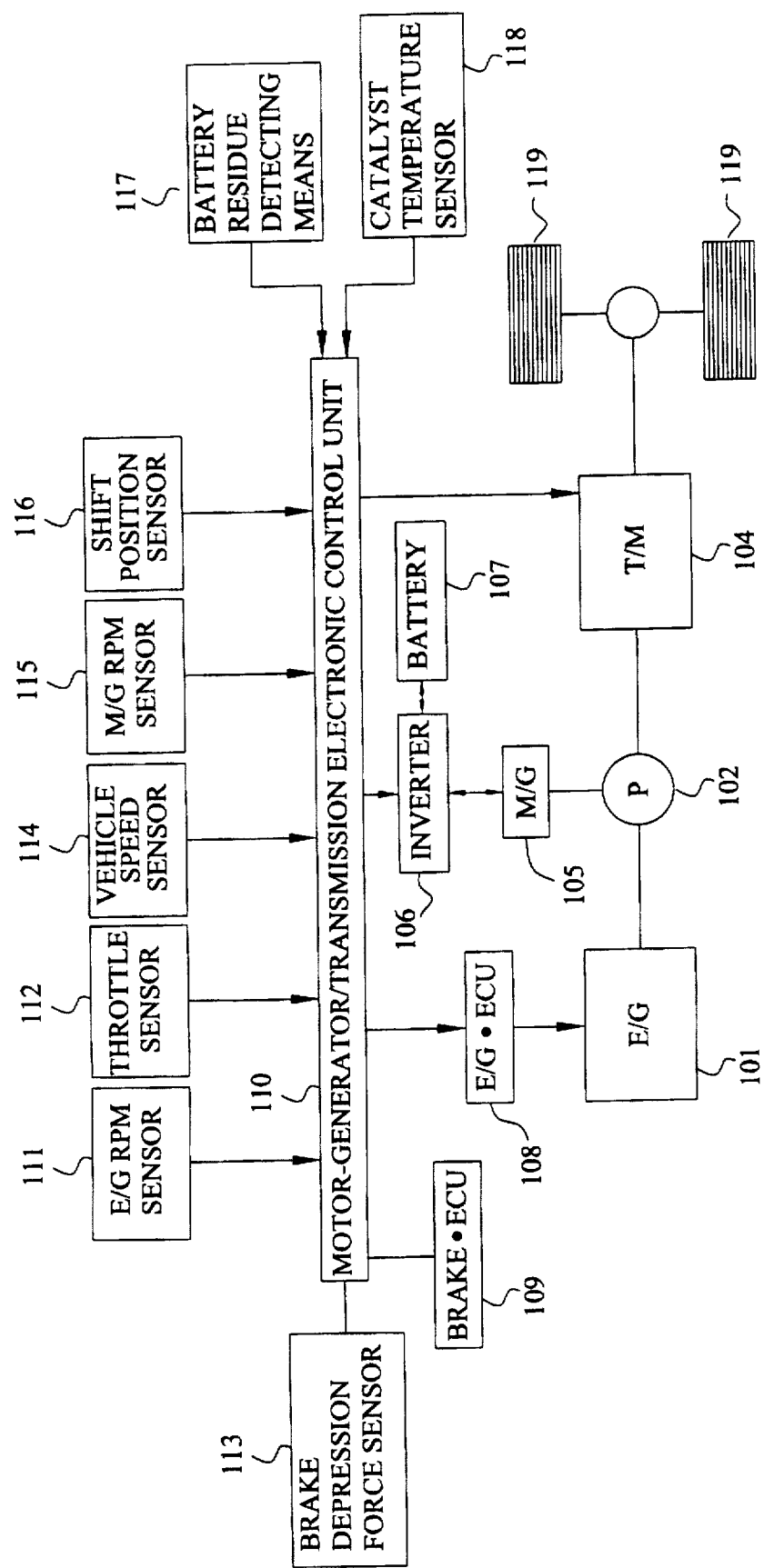
FIG. 10 is a block diagram showing the structure of a vehicular drive unit according to a third mode of the embodiment of the invention.
Figure 11:
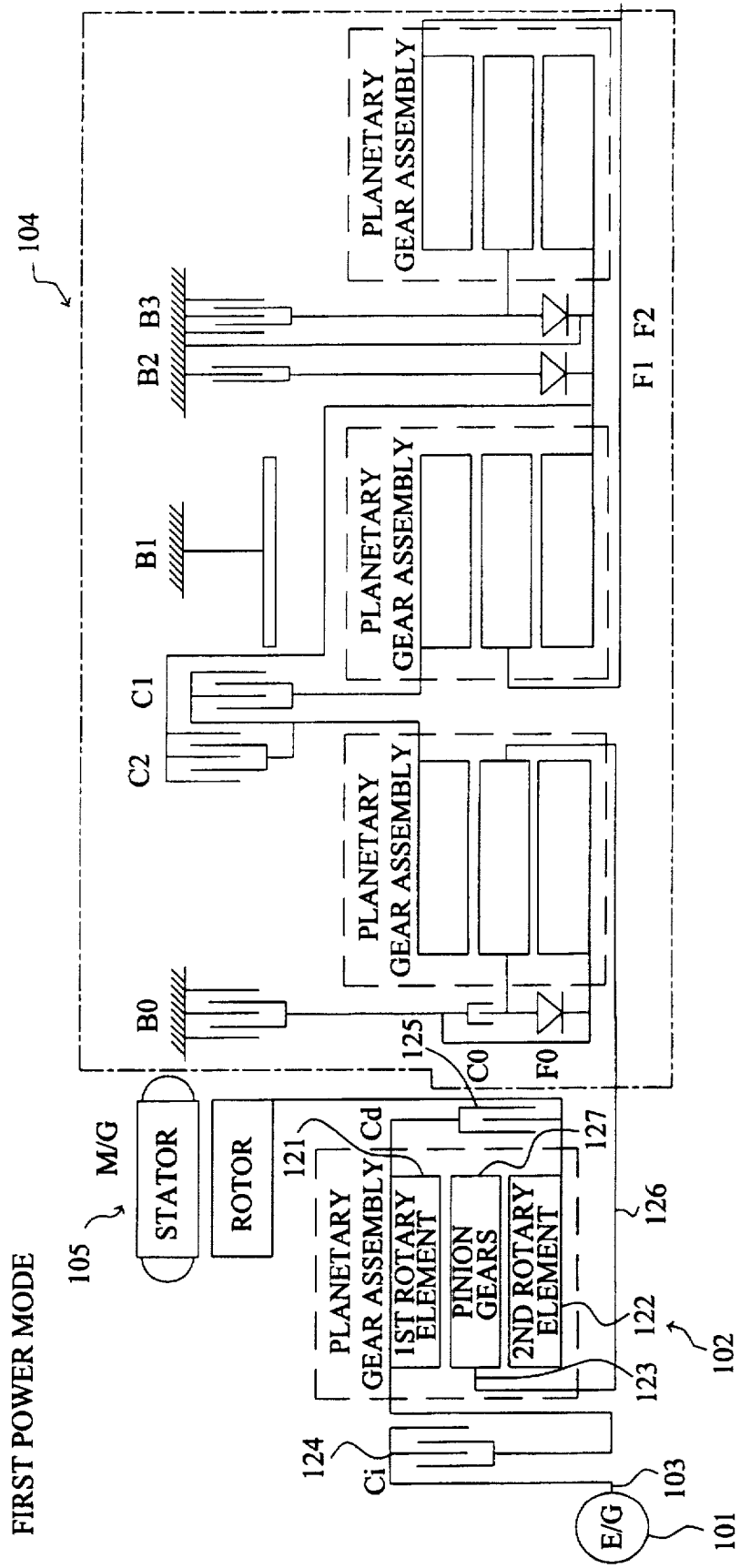
FIG. 11 is a diagram showing the structure of a first power train of the vehicular drive unit according to the mode of the embodiment.
Figure 12:
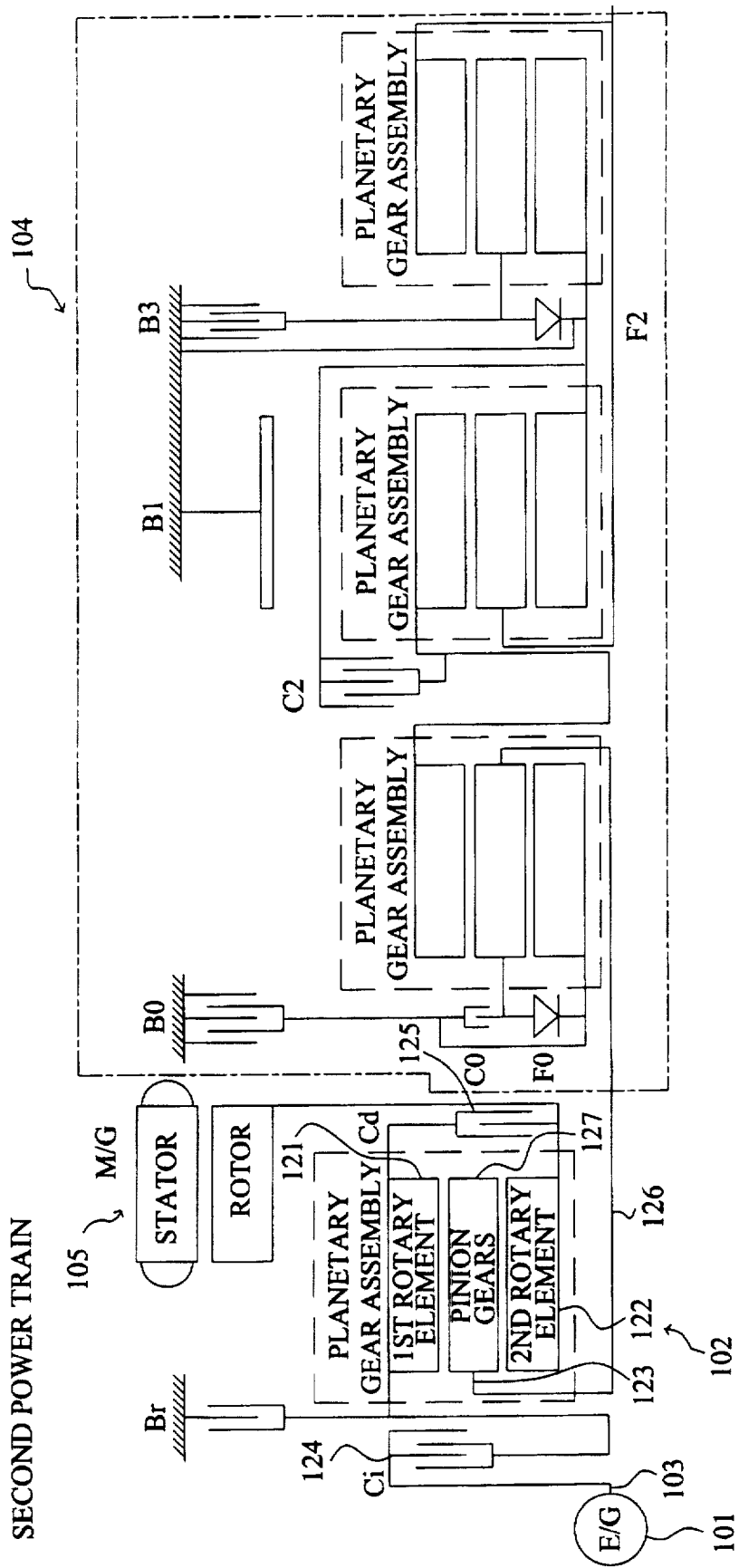
FIG. 12 is a diagram showing the structure of a second power train of the vehicular drive unit according to the mode of the embodiment.

FIG. 10 is a diagram showing the entire structure of a vehicular drive unit according to still another mode of the embodiment of the invention; FIG. 11 is a diagram showing the structure of a first power train of the vehicular drive unit according to the mode of the embodiment; and FIG. 12 is a diagram showing the structure of a second power train of the vehicular drive unit according to the mode of the embodiment.

In the Figures, reference numeral 101 designates an engine (E/G), and numeral 102 designates a power transmission (or a power distribution mechanism) (P), which includes a planetary gear having at least three rotary components and an engagement means, e.g., an input clutch Ci and a direct-coupled clutch Cd for selectively applying/releasing the rotary elements. Numeral 104 designates a transmission (T/M), connected to the power transmission 102, and numeral 105 designates a motor-generator acting as a motor and a generator and connected to the power transmission 102. Numeral 106 designates an inverter connected to the motor-generator 105, numeral 107 a battery connected with the inverter 106, numeral 108 an engine electronic control unit (E/G ECU) for controlling the engine 101, numeral 109 a brake electronic control unit (BRAKE ECU), numeral 110 a motor-generator/transmission electronic control unit, numeral 111 an engine RPM sensor, numeral 112 an throttle sensor, numeral 113 a brake depression force sensor, numeral 114 a vehicle speed sensor, numeral 115 a motor-generator (M/G) RPM sensor, numeral 116 a shift position sensor, numeral 117 a battery residue detecting means for detecting the residue of electricity, numeral 118 a catalyst temperature sensor for detecting the temperature of a catalyst arranged midway of the exhaust pipe for discharging the exhaust gases, and numeral 119 the wheels. The transmission (T/M) 104 is a four-speed transmission mechanism including a C0 clutch, a C1 clutch, a C2 clutch, an F0 one-way clutch, an F1 one-way clutch, an F2 one-way clutch, a B0 brake, a B1 brake, a B2 brake, a B3 brake and planetary gears.

Thus, the vehicular drive unit of the invention includes the engine 101; the power transmission 102, connected to the output shaft of the engine 101, which acts as a power distribution mechanism for distributing the power; the transmission (T/M) 104 connected to the power transmission 102; and the battery 107 for storing the energy recovered by motor-generator 105 as electric power and for feeding electric power to drive the motor-generator. The planetary gear assembly (unnumbered) connects a first rotary element (or ring gear) 121 to the output shaft 103 of the engine 101, a second rotary element (or sun gear) 122 acting as a reaction element, against the first rotary element 121 to the motor-generator 105, and a third rotary element (or carrier) 123 supporting a plurality of pinion gears 127 to an output member 126 for transmitting the power to the wheels 119.

The first power train of the vehicular drive unit, as shown in FIG. 11, performs the operations shown in FIGS. 13(a)–(g).

(1) Idling Mode: In the "P" or "N" range, as shown at FIG. 13(a), the Ci clutch 124 is ON; the Cd clutch 125 is OFF; the motor-generator (M/G) 105 is free; and the C0 clutch, the B0 brake, the F0 one-way clutch, the C1 clutch, the C2 clutch, the B1 brake, the B2 brake, the B3 brake, the F1 one-way clutch and the F2 one-way clutch are all OFF. In the "R" range, as shown in FIG. 13(b), the Ci clutch 124 is ON; the Cd clutch 125 is OFF; the motor-generator (M/G) is free; the C0 clutch is ON; the B0 brake is OFF; the F0 one-way clutch is ON; the C1 clutch is OFF; the C2 clutch is ON; the B1 brake and the B2 clutch are OFF; the B3 brake is ON; and the F1 one-way clutch and the F2 one-way clutch are OFF. In the "D (2 or L)" range, as shown in FIG. 13(c), the Ci clutch 124 is ON; the Cd clutch 125 is OFF; the motor-generator (M/G) is free; the C0 clutch is ON, the B0 brake is OFF; the F0 one-way clutch is ON; the C1 clutch is ON; the C2 clutch, the B1 brake, the B2 brake, the B3 brake and the F1 one-way clutch are OFF; and the F2 one-way clutch is ON.

(2) Motoring Mode: In the "P" or "N" range, as shown in FIG. 13(d), the Ci clutch 124 and the Cd clutch 125 are ON; the motor-generator (M/G) is in the motoring mode; the C0 clutch and the B0 brake are OFF; the F0 one-way clutch is ON; and the C1 clutch, the C2 clutch, the B1 brake, the B2 brake, the B3 brake, the F1 one-way clutch and the F2 one-way clutch are OFF. In the "D (2 or L)" range, as shown in FIG. 13(e), the Ci clutch 124 is ON; the Cd clutch 125 is OFF; the motor-generator (M/G) is in the motoring mode; the C0 clutch is ON; the B0 brake is OFF; the F0 one-way clutch and the C1 clutch are ON; the C2 clutch, the B1 brake, the B2 brake, the B3 brake and the F1 one-way clutch are OFF; and the F2 one-way clutch is ON.

(3) Generating Mode: In the "P" or "N" range, as shown in FIG. 13(f), the Ci clutch 124 and the Cd clutch 125 are ON; the motor-generator (M/G) is generating; the C0 clutch and the B0 brake are OFF; the F0 one-way clutch is ON; and the C1 clutch, the C2 clutch, the B1 brake, the B2 brake, the B3 brake, the F1 one-way clutch and the F2 one-way clutch are OFF. In the "D (2 or L)" range, as shown in FIG. 13(g), the Ci clutch 124 is ON; the Cd clutch 125 is OFF; the motor-generator (M/G) is generating; the C0 clutch is ON; the B0 brake is OFF; the F0 one-way clutch and the C1 clutch are ON; the C2 clutch, the B1 brake, the B2 brake, the B3 brake and the F1 one-way clutch are OFF; and the F2 one-way clutch is ON.

The second power train of the vehicular drive unit, as shown in FIG. 12, performs the operations shown in FIGS. 14(a)–(g).

(1) Idling Mode: In the "P" or "N" range, as shown in FIG. 14 (a): the Ci clutch 124 is ON; the Cd clutch 125 is OFF; the reverse Br brake is OFF; the motor-generator (M/G) is free; and the C0 clutch, the B0 brake, the F0 one-way clutch, the C2 clutch, the B1 brake, the B3 brake and the F2 one-way clutch are OFF. In the "R" range, as shown in FIG. 14(b), the Ci clutch 124 and the Cd clutch 125 are OFF; the Br brake is ON; the motor-generator (M/G) is free; the C0 clutch is ON; the B0 brake, the F0 one-way clutch, the C2 clutch and the B1 brake are OFF; the B3 brake is ON; and the F2 one-way clutch is OFF. In the "D (2 or L)" range, as shown in FIG. 14(c), the Ci clutch 124 is ON; the Cd clutch 125 is OFF; the Br brake is OFF; the motor-generator (M/G) is free; the C0 clutch is ON; the B0 brake is OFF; the F0 one-way clutch is ON; the C2 clutch, the B1 brake and the B3 brake are OFF; and the F2 one-way clutch is ON.

(2) Motoring Mode: In the "P" range, as shown in FIG. 14(d), the Ci clutch 124 is ON; the Cd clutch 125 and the Br brake are OFF; the motor-generator (M/G) is in the motoring mode; the C0 clutch is OFF; the B0 brake is ON; the F0 one-way clutch is OFF; the C2 clutch is ON; and the B1 brake, the B3 brake and the F2 one-way clutch are OFF. In the "D (2 or L)" range, as shown in FIG. 14(e), the Ci clutch 124 is ON; the Cd clutch 125 and the Br brake are OFF; the motor-generator (M/G) is in the motoring mode; the C0 clutch is ON; the B0 brake is OFF; the F0 one-way clutch is ON; the C2 clutch, the B1 brake and the B2 brake are OFF; and the F2 one-way clutch is ON.

(3) Generating Mode: In the "P" range, as shown in FIG. 14(f), the Ci clutch 124 is ON; the Cd clutch 125 and the Br brake are OFF; the motor-generator (M/G) is generating; the C0 clutch is OFF; the B0 brake is ON; the F0 one-way clutch is OFF; the C2 clutch is ON; and the B1 brake, the B3 brake and the F2 one-way clutch are OFF. In the "D (2 or L)" range, as shown in FIG. 14(g), the Ci clutch 124 is ON; the Cd clutch 125 and the Br brake are OFF; the motor-generator (M/G) is generating; the C0 clutch is ON; the B0 clutch is OFF; the F0 one-way clutch is ON; the C2 clutch, the B1 brake and the B3 brake are OFF; and the F2 one-way clutch is ON.

Thus, the vehicular drive unit of the invention comprises an engine 101; a planetary gear having at least three rotary elements connected to the engine 101; a motor-generator 105 acting as a motor and a generator connected to the planetary gear; and a battery 107 for storing the energy recovered by the motor-generator 105 as electric power, and for feeding electric power to drive the motor-generator 105. The planetary gear has a first rotary element 121 connected to the output shaft 103 of the engine 101, a second rotary element 122 acting as a reaction element against the first rotary element 121 and connected to the motor-generator 105, and a third rotary element 123 connected to an output member 126 for transmitting the power to wheels 119.

Moreover, the vehicular drive unit of the invention further comprises stop state detecting means including a vehicle speed sensor 114 and a throttle sensor 112; an engine/ECU 108 for controlling the engine 101 in accordance with the output signals of the stop state detecting means 114 and the throttle sensor 112; and an ECU 110 for controlling the motor-generator 105. When the stopped state of the vehicle is detected by the stop state detecting means, the engine/ECU 108 interrupts the feed of fuel to the engine 101, and the ECU 110 for controlling the motor-generator drives the motor-generator 105 to hold the rotation of the engine 101 substantially at the idling RPM.

According to this structure, at a stop of the vehicle, the feed of fuel to the engine 101 is interrupted so that the fuel consumption rate and the exhaust gases can be reduced. Moreover, the engine 101 is held substantially at the idling RPM by the motor-generator 105 so that the accessories to be driven by the engine 101 can be operated.

In addition to the aforementioned structure, the vehicular drive unit further comprises residue detecting means 117 for detecting the electric power residue of the battery 107. When the stopped state of the vehicle is detected by the stop state detecting means and when the residue detected by the battery residue detecting means 117 is below the predetermined value of 60%, the engine/ECU 108 feeds fuel to the engine 101 to retain a predetermined RPM, and the ECU 110 for controlling the motor-generator causes the motor-generator 105 to generate electric power.

According to this structure, when the motoring mode, in which the engine 101 is driven by the motor-generator 105, is continued for a long time, the stored capacity of the battery 107 for the power source of the motor-generator 105 is exhausted deteriorating performance and shortening the lifetime of the battery 107. Thus, when the residue of the battery 107, monitored by the residue detecting means 117, becomes lower than the predetermined value of 60%, the mode is brought into the generating one, in which fuel is fed to the engine 101 to cause the motor-generator 105 to generate electric power to thereby charge the battery 107. As a result, the stored capacity of the battery 107 is maintained higher than the predetermined value to improve the performance and lengthen the lifetime of the battery 107.

The vehicular drive unit further comprises a catalyst temperature sensor 118 for detecting the temperature of a catalyst arranged midway of the exhaust pipe. When the vehicle is in a stopped state and when the catalyst temperature detected by the catalyst temperature sensor 118 is below a predetermined value, the engine/ECU 108 feeds fuel to the engine 101 to retain the engine 101 substantially at the idling RPM.

According to this structure, if only the motoring mode is effected in the idling mode, the catalyst temperature drops to inactivate the catalyst, and the exhaust gases at the restart of the engine 101 may be seriously deteriorated. When the catalyst temperature, monitored by the catalyst temperature sensor 118, is below the predetermined value of 750° C., fuel is fed to the engine 101 to effect the idling mode for retaining the engine 101 at the idling RPM thereby preventing a drop in the catalyst temperature. As a result, the temperature of the catalyst can be kept higher than the predetermined value to prevent the degradation of the exhaust gases.

The vehicular drive unit further comprises a brake/ECU 109 for controlling the oil pressure of the brake, and the brake/ECU 109 holds the oil pressure of the brake over a predetermined value which maintains the vehicle in a stopped state.

This latter action will be described in the following with reference to FIG. 15.

Figure 15A:
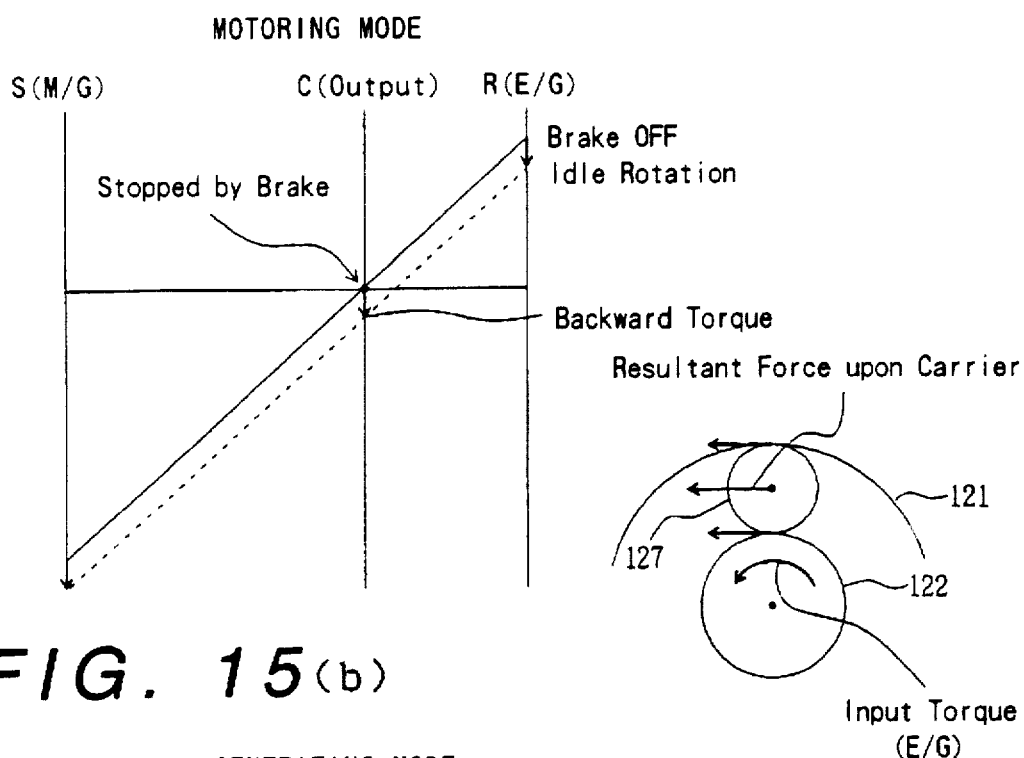
FIGS. 15(a)–15(b) are a diagram showing the operation of a power transmission.

For a forward running range, in the motoring mode, as shown in FIG. 15(a), the third rotary element (or carrier) 123 connected to the output member 126 is stopped because the driver depresses the brake pedal. Moreover, the motor-generator 105 connected to the second rotary element (or sun gear) 122 outputs the torque to rotate the second rotary element (or sun gear) 122 backward so that the first rotary element (or ring gear) 121, acting as the reaction member, is rotated forward to retain the engine 101 substantially at the idling RPM. As a result, the third rotary element (or carrier) 123 is always subjected to the torque for rotating it backward, by the torque of the motor-generator 105, so that a creep is caused in the vehicle to complicate the braking operation of the driver.

Figure 15B:
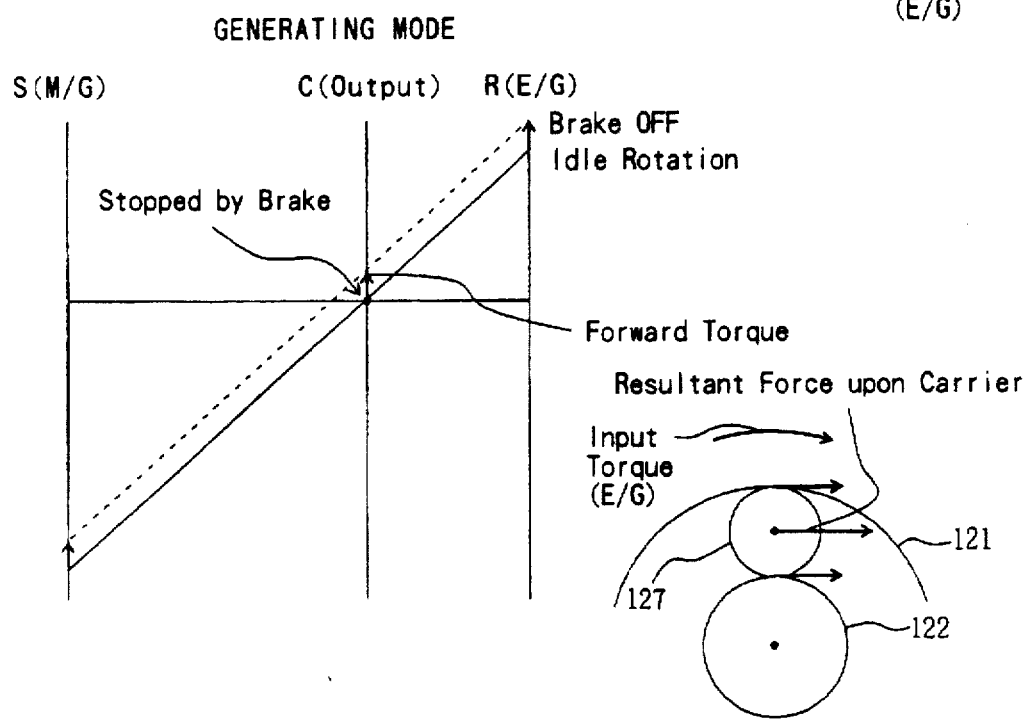

In the generating mode, as shown in FIG. 15(b), the third rotary element (or carrier) 123 connected to the output member 126 is stopped because the driver depresses the brake pedal. Moreover, the first rotary element (or ring gear) 121 is rotated forward because the engine 101 is held substantially at the idling RPM by the fuel feed. On the other hand, the second rotary element (or sun gear) 122 is rotated backward. As a result, the third rotary element (or carrier) 123 is always subjected to the forward torque from the engine 101 so that a creep is caused in the vehicle to complicate the braking operation of the driver.

Figure 21:
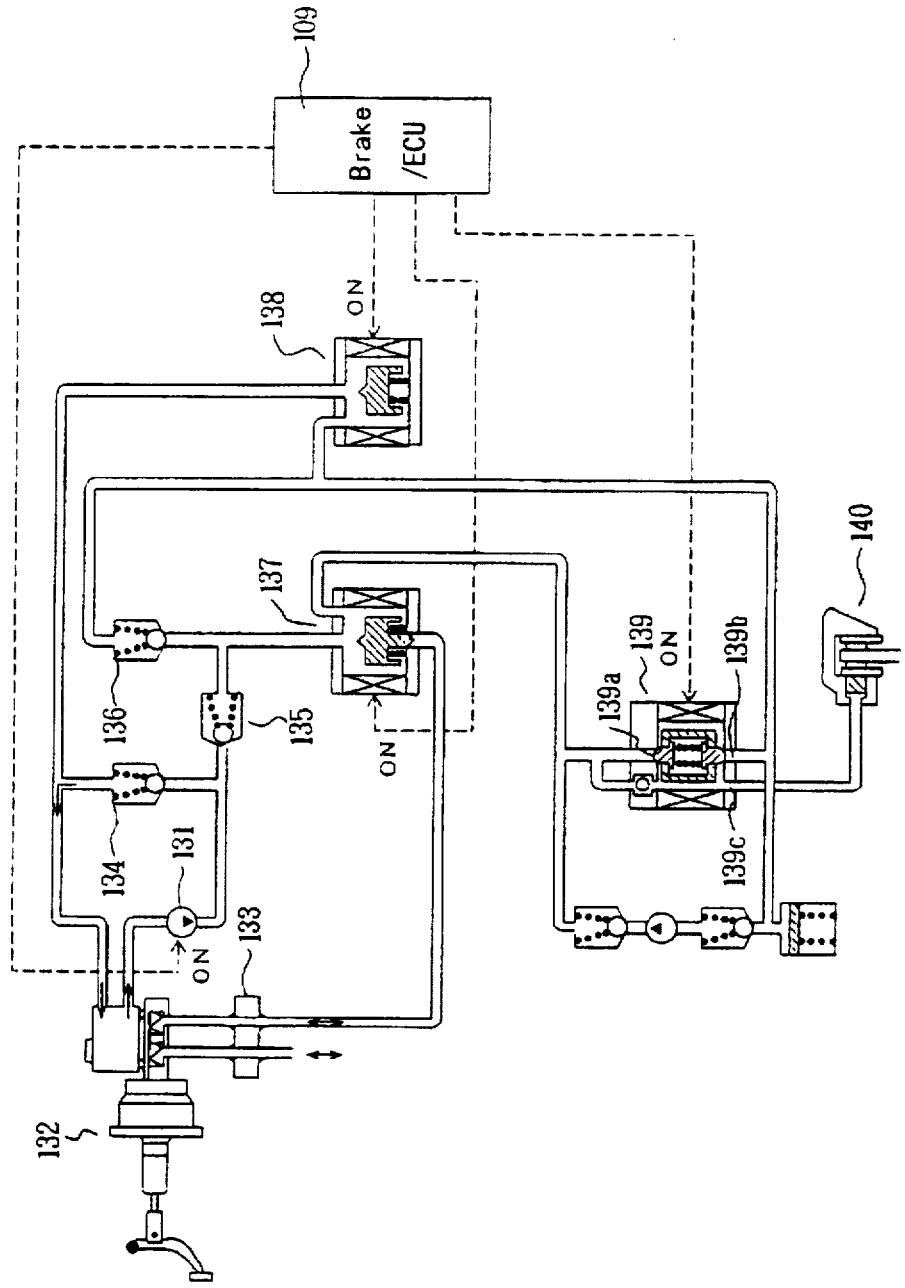
FIG. 21 is a diagram showing the braking control brake oil pressure for the hold mode (for holding the brake oil pressure) according to the mode of the embodiment.

According to the invention, therefore, the brake/ECU 109 holds the brake oil pressure over a predetermined level when the vehicle is at a stop, so that the complicated braking operation of the driver can be prevented (as shown in FIG. 21).

Figure 16:
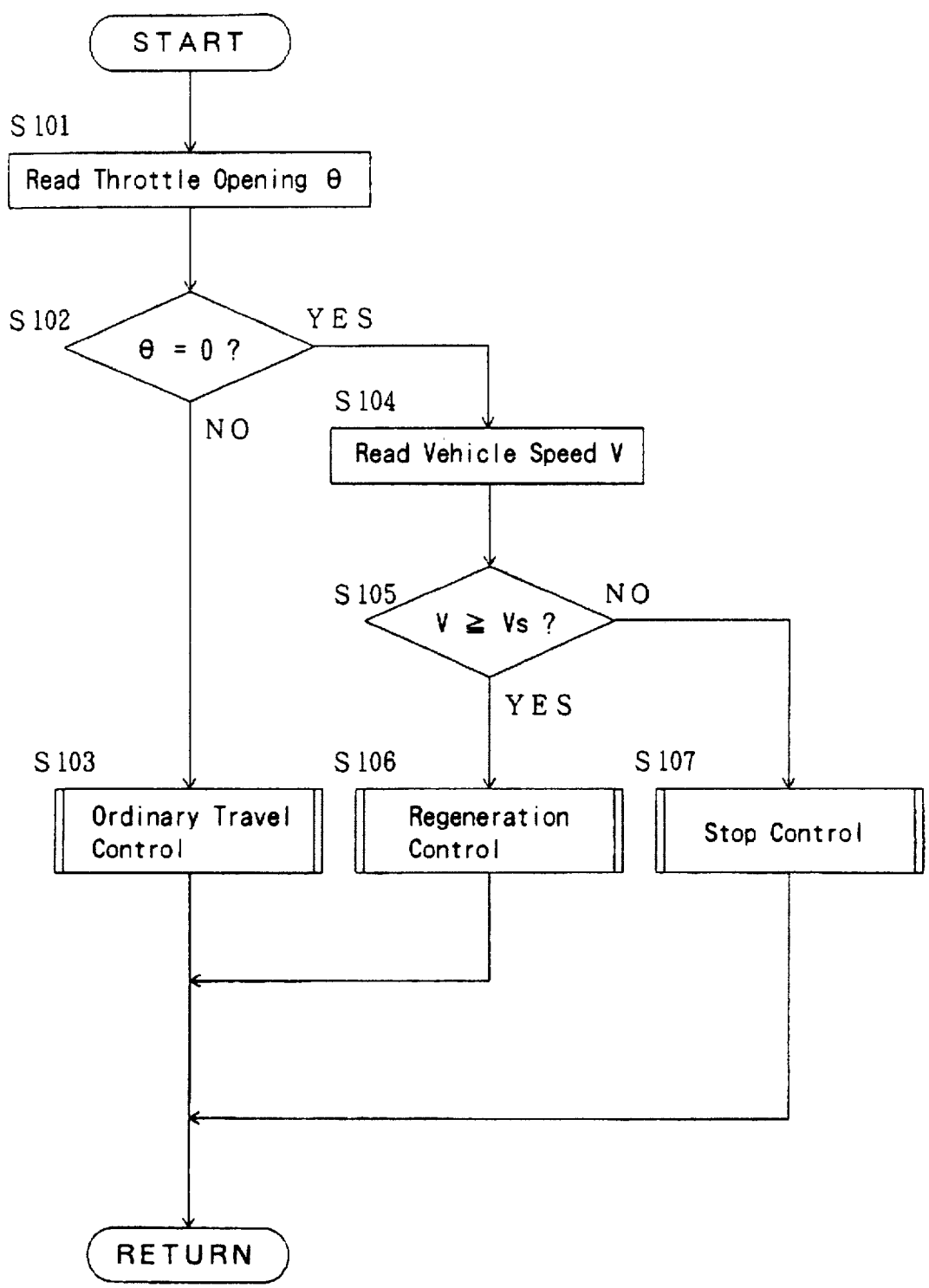
FIG. 16 is a flow chart showing the vehicle control of the mode of the embodiment.

The specific control of the vehicular drive unit will be described with reference to the flow charts of FIGS. 16–18. FIG. 16 shows the vehicle control of the mode of the embodiment. First of all, the throttle opening θ is read (at Step S101) on the basis of the information coming from the throttle sensor. Next, it is determined (at Step S102) whether the throttle opening is 0. If the answer of Step S102 is NO, then ordinary travel control is executed (at Step S103).

If the answer at Step S102 is YES, the vehicle speed V is read (at Step S104) from the vehicle speed sensor 14. Next, it is determined (at Step S105) whether the vehicle speed V is over a predetermined value Vs. Here, the predetermined value Vs is substantially 0.

If the answer at Step S105 is YES, it is determined that the throttle is OFF and that the vehicle is in the decelerating state, and the regenerative energy is recovered (at Step S106). If the answer at Step S105 is NO, it is decided that the vehicle is at a stop, and stop control is entered (at Step S107).

Figure 17:
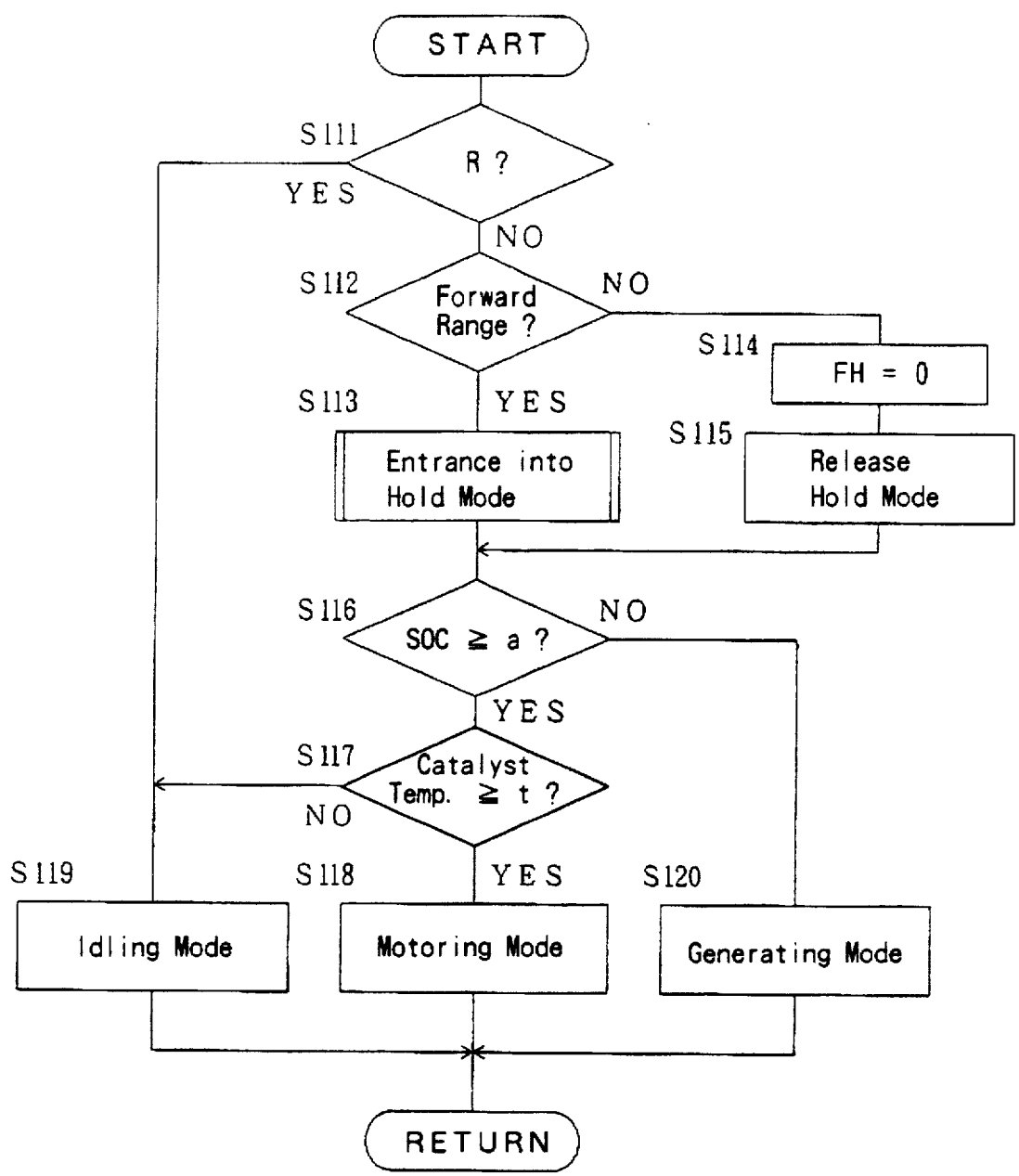
FIG. 17 is a flow chart showing the stop control of the mode of the embodiment.

FIG. 17 shows a stop control of the mode of the embodiment. It is determined (at Step S111) from the information of the shift position sensor 116 whether the selected range is R (or reverse). If the answer at Step S111 is NO, it is determined (at Step S112) whether the selected range is the forward range (D, 2 or L). If the answer of Step S112 is YES, the hold mode control is entered (at Step S113).

If the answer at Step S112 is NO, that is, if the range is "P or N", the flag FH indicating the hold mode operation is set to FH=0 (at Step S114). Next, the hold mode is turned OFF (or released) (at Step S115). Since, in this case, the clutch C1 of the T/M 104 is released in the P or N range, no creep is caused so that the vehicle can be held in the stopped state even if the hold mode is released.

Next, it is determined (at Step S116) from the information from the battery residue detecting means 117 whether the residue of the battery is over a defined value a, such as 60%.

If the answer at Step S116 is YES, it is determined (at Step S117) from the information of the catalyst temperature sensor 118 whether the catalyst temperature is over a defined value t, such as 750° C.

If the answer at Step S117 is YES, the mode is set to the motoring mode (at Step S118). In other words, the fuel feed to the engine 101 is interrupted by the command coming from the engine/ECU 108, and the engine 101 is driven by the motor-generator 105.

If the answer of Step S111 is YES, that is, if the vehicle is in the R range, or if the answer of Step S117 is NO, that is, if the catalyst temperature is below a defined value, the fuel is fed to the engine 101 in response to the command of the engine/ECU 108 to hold the idling mode, i.e., the idling RPM (at Step S119). In other words, if in the R range, the idling mode is executed for preparing the start. If the catalyst temperature monitored by the catalyst temperature sensor 118 is low, on the other hand, the engine 101 is idled to raise the catalyst temperature.

If the answer of Step S116 is NO, the mode is entered into the generating mode (at Step S120). Specifically, fuel is fed to the engine 101 in response to the command from the engine/ECU 108 so that the motor-generator 5 generates electric power to increase the residue of the battery.

The steps thus far described belong to the case of the first power train but can be likewise applied to the case of the second power train.

Figure 18:
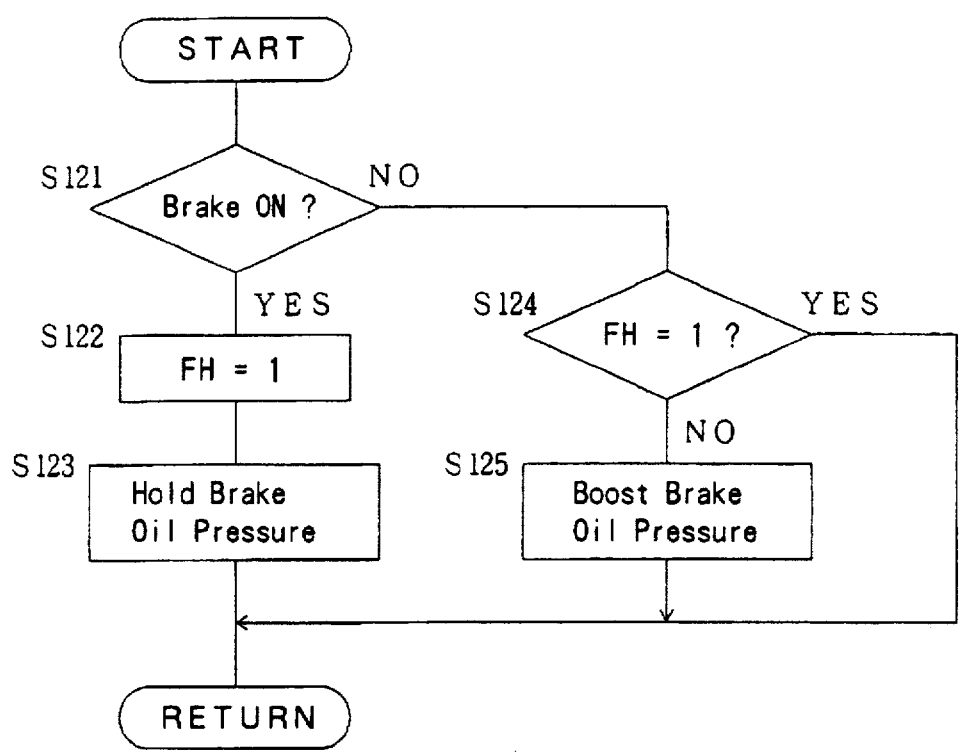
FIG. 18 is a flow chart showing the hold mode of the mode of the embodiment.

FIG. 18 shows a hold mode of the mode of the embodiment of the invention and control of the brake will be detailed with reference to FIGS. 19 to 21.

First of all, it is determined (at Step S121), on the basis of the information from the brake depression sensor 113, whether the brake pedal is depressed.

If the answer at Step S121 is YES, that is, if the brake pedal is depressed, the flag FH of the hold mode is set to FH=1 (at Step S122). Next, the solenoid valve is switched in response to the command from the brake/ECU 109 to hold the brake oil pressure (at Step S123).

If the answer at Step S121 is NO, that is, if the brake pedal is not depressed, it is determined (at Step S124) whether the flag FH of the hold mode is FH=1.

If it is determined at Step S124 that the flag FH of the hold mode is not FH=1, the brake oil pressure is boosted. If the vehicle is stopped without a braking operation, for example, on a hill and the brake pedal is not depressed, then no brake oil pressure is produced because the brake pedal is not operated. As a result, the necessary oil pressure to maintain the stopped state is produced by driving the pump in response to the command coming from the brake/ECU 109. If the hold mode flag FH is FH=1 at Step S124, the hold mode is retained as it is.

The brake oil pressure system for brake control according to the mode of the embodiment of the invention will now be described.

Figure 19:
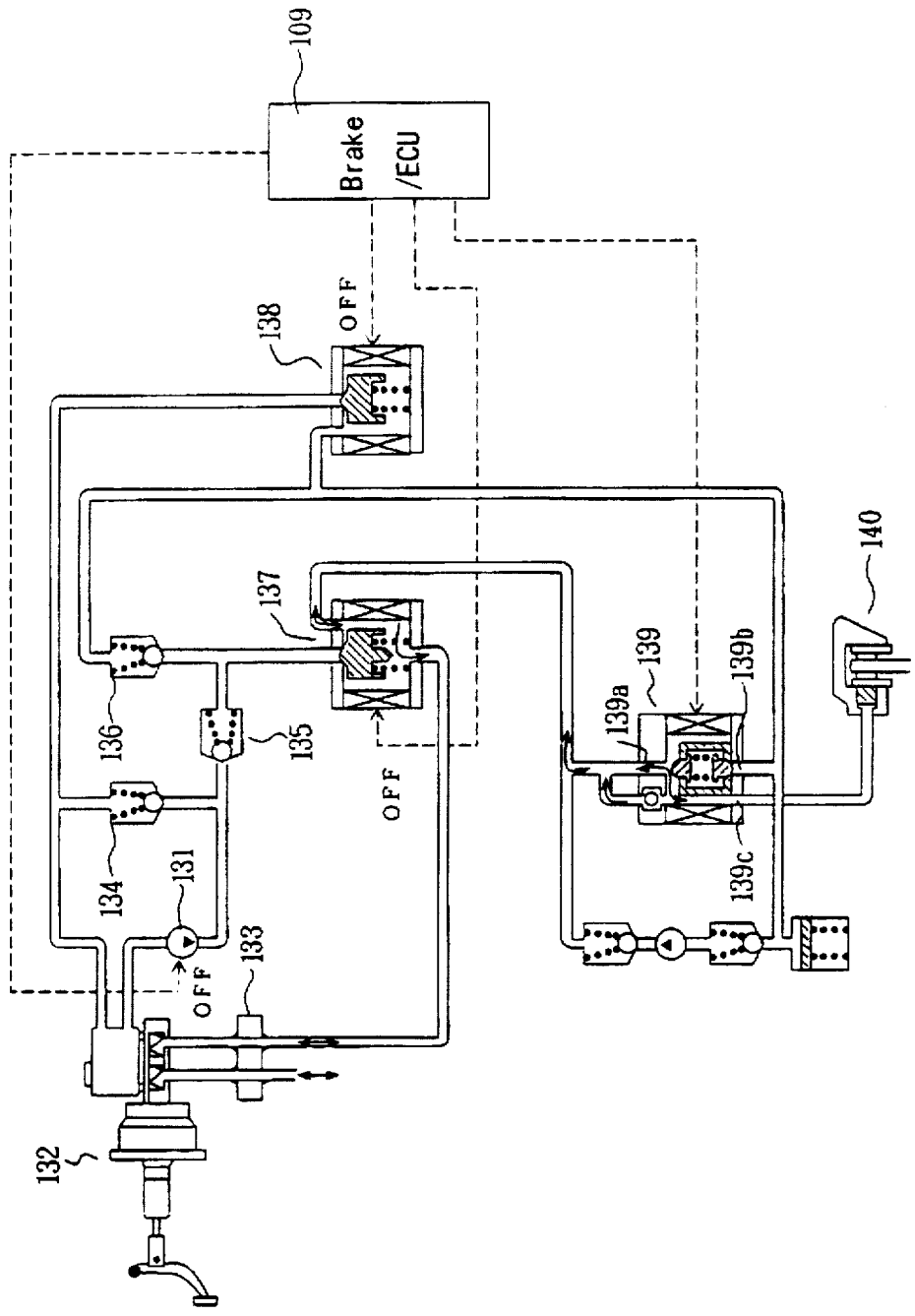
FIG. 19 is a diagram showing the braking control brake oil pressure for the hold mode OFF according to the mode of the embodiment.

FIG. 19 shows a braking control brake oil pressure for the hold mode OFF according to the mode of the embodiment. Reference numeral 131 designates a pump; numeral 132 a master cylinder; numeral 133 a P&B valve; numeral 134 a pressure regulator valve; numeral 135 a check valve; numeral 136 a relief valve; numeral 137 a master cylinder cut solenoid valve; numeral 138 a reverse cut solenoid valve; numeral 139 a three-position solenoid valve; numeral 139a a port a of the three-position solenoid valve 139; numeral 139b a port b of the three-position solenoid valve 139; numeral 139c a port c of the three-position solenoid valve 139; and numeral 140 a rear wheel cylinder. Of these, the pump 131, the master cylinder cut solenoid valve 137, the reservoir cut solenoid valve 138 and the three-position solenoid valve 139 are individually controlled by the brake/ECU 109.

In the hold mode OFF, as shown in FIG. 19, the pump 131 is OFF; the port a (139a) is open; the port b (139b) is closed; the oil pressure from the pump 131 is shut off by the master cylinder cut solenoid valve 137; and the hold mode is OFF.

Figure 20:
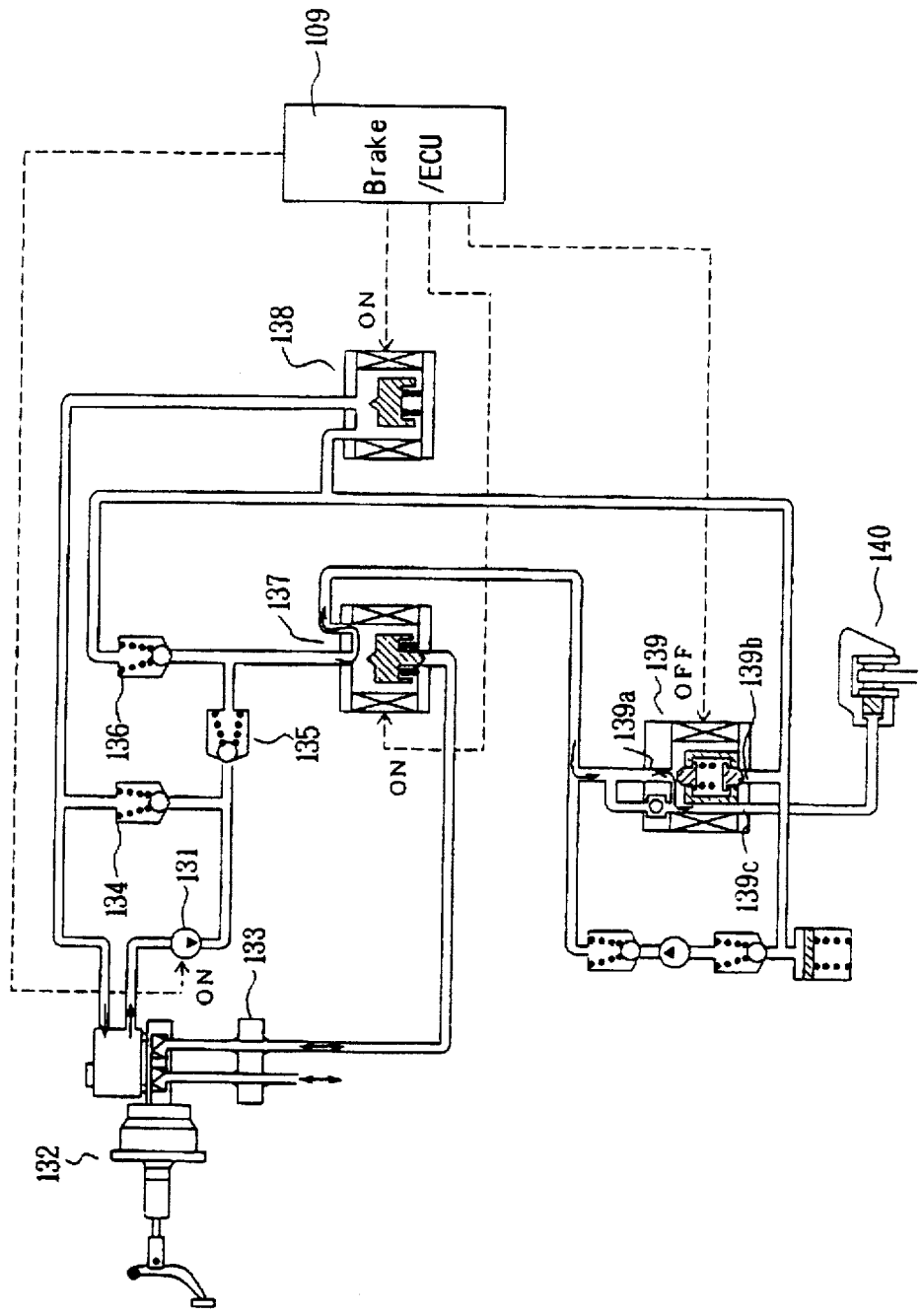
FIG. 20 is a diagram showing the braking control brake oil pressure for the hold mode (for boosting the brake oil pressure) according to the mode of the embodiment.

FIG. 20 is a flow sheet showing a braking control brake oil pressure for the hold mode (for boosting the brake oil pressure) according to the mode of the embodiment. In the hold mode (for boosting the brake oil pressure), as shown in FIG. 20, the pump 131 is active; the port a (139a) is open; the port b (139b) is closed; and the oil pressure from the pump 131 is fed through the master cylinder cut solenoid valve 137, as opened, and through the port a (139a) and the port c (139c) to the rear wheel cylinder 140 to boost the brake oil pressure.

FIG. 21 is a flow sheet showing a braking control brake oil pressure for the hold mode (for holding the brake oil pressure) according to the mode of the embodiment. In the hold mode (for holding the brake oil pressure), as shown in FIG. 21, the pump 131 is active but the port a (139a) is closed so that the oil pressure of the rear wheel cylinder 140 takes the hold mode to hold the brake oil pressure.

Incidentally, the invention should not be limited to the foregoing embodiment but could be modified in various manners on the basis of this description, and any such modifications should not be excluded from the scope of the invention.

What is claimed is:

1. A control system for a vehicular drive unit, comprising:
   an engine;
   a motor-generator connected to the output shaft of said engine for acting as a motor and a generator;

a battery for storing the energy recovered by said motor-generator as electric power and for feeding electric power to drive said motor-generator;

a first clutch for connecting said motor-generator and the wheels;

stop state detecting means for detecting the stopped state of the vehicle; and control means for controlling said engine, said motor-generator and said first clutch, wherein when the stopped state of the vehicle is detected by said stop state detecting means, said control means releases said first clutch, interrupts the feed of fuel to said engine, and feeds the electric power to said motor-generator to drive said motor-generator thereby to hold the rotation of said engine substantially at an idling RPM.

2. A control system according to claim 1, wherein said control means includes stop time metering means for metering the stop time period of the vehicle, to hold the rotation of said engine at a predetermined RPM smaller than an idling RPM when the stop time period is over a predetermined value.

3. A control system according to claim 1, further comprising residue detecting means for detecting the electric power residue of said battery, wherein when the stopped state of said vehicle is detected by said stop state detecting means and when the residue of said battery detected by said residue detecting means is over a predetermined value, said control means releases said first clutch, interrupts the feed of fuel to said engine and feeds electric power to said motor-generator to bring the motor-generator into a drive state thereby to hold the rotation of said engine substantially at the idling RPM.

4. A control system according to claim 1, further comprising a power steering switch for detecting the action of a power steering, wherein when the stopped state of said vehicle is detected by said stop state detecting means and when it is detected by said power steering switch that said power steering is inactive, said control means releases said first clutch, interrupts the feed of fuel to said engine and feeds electric power to said motor-generator to bring the same into a drive state thereby to hold the rotation of said engine substantially at the idling RPM.

5. A control system according to claim 1, further comprising a catalyst temperature sensor for detecting a catalyst temperature, wherein when the stopped state of said vehicle is detected by said stop state detecting means and when the catalyst temperature detected by said catalyst temperature sensor is over a predetermined value, said control means releases said first clutch, interrupts the feed of fuel to said engine and feeds electric power to said motor-generator to bring the motor-generator into a drive state thereby to hold the rotation of said engine substantially at the idling RPM.

6. A control system unit according to claim 1, further comprising a second clutch for connecting said engine and said motor-generator, wherein when the output signal detected by the brake sensor is switched from ON to OFF while said motor-generator is in the drive state, said control means reopens the feed of fuel to said engine, interrupts the drive of said motor-generator, releases said second clutch, brings said motor-generator into a generating state, and applies said first clutch.

7. A control system according to claim 1, further comprising a fluid coupling having a lockup clutch between said engine and said motor-generator, wherein when the stopped state of said vehicle is detected by said stop state detecting means, said control means releases said first clutch, applies said lockup clutch, interrupts the feed of fuel to said engine and feeds electric power to said motor-generator to bring the motor-generator into a drive state thereby to hold the rotation of said engine substantially at the idling RPM.

8. A control system according to claim 7, wherein when the output signal detected by the brake sensor is switched from ON to OFF while said motor-generator is in the drive state, said control means reopens the feed of fuel to said engine, interrupts the drive of said motor-generator, releases said lockup clutch, brings said motor-generator into a generating state, and applies said first clutch.

9. A control system for a vehicular drive unit, comprising:

an engine;

a motor-generator acting as a motor and a generator;

a planetary gear having at least three rotary elements, the first rotary element of said planetary gear being connected to the output shaft of said engine, the second rotary element being connected to said motor-generator to perform a reaction against said first rotary element, and the third rotary element being connected to an output member for transmitting power to wheels;

a battery for storing energy recovered by said motor-generator as electric power, and for feeding electric power to drive said motor-generator, stop state detecting means for detecting a stopped state of the vehicle; and control means for controlling said engine and said motor-generator, wherein when the stopped state of the vehicle is detected by said stop state detecting means, said control means interrupts the feed of fuel to said engine, and feeds the electric power to said motor-generator thereby to hold the rotation of said engine substantially at an idling RPM.

10. A control system according to claim 9, further comprising residue detecting means for detecting the electric power residue of said battery, wherein when the stopped state of the vehicle is detected by said stop state detecting means and when the residue detected by said residue detecting means is below a predetermined value, said control means feeds the fuel to said engine to hold the rotation of said engine at a predetermined RPM and causes said motor-generator to generate the electric power.

11. A control system according to claim 9, further comprising a catalyst temperature sensor for detecting a catalyst temperature, wherein when the stopped state of the vehicle is detected by said stop state detecting means and when the catalyst temperature detected by said catalyst temperature sensor is below a predetermined value, said control means feeds the fuel to said engine to hold the rotation of said engine substantially at an idling RPM.

12. A control system according to claim 9, further comprising brake control means for controlling the oil pressure of a brake, wherein when the stopped state of the vehicle is detected by said stop state detecting means, said brake control means holds said brake oil pressure over a predetermined value.

* * * * *